US010845327B2

(12) United States Patent
Nakayama et al.

(10) Patent No.: US 10,845,327 B2
(45) Date of Patent: Nov. 24, 2020

(54) GAS SENSOR

(71) Applicant: NGK INSULATORS, LTD., Nagoya (JP)

(72) Inventors: Yuki Nakayama, Nagoya (JP); Noriko Hirata, Nagoya (JP); Taku Okamoto, Nagoya (JP); Kosuke Monna, Frankfurt am Main (DE)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 16/253,243

(22) Filed: Jan. 22, 2019

(65) Prior Publication Data

US 2019/0154628 A1 May 23, 2019

Related U.S. Application Data

(63) Continuation of application No. PCT/JP2017/028685, filed on Aug. 8, 2017.

(30) Foreign Application Priority Data

Aug. 9, 2016 (JP) .................. 2016-156298

(51) Int. Cl.
*G01N 27/41* (2006.01)
*G01N 27/409* (2006.01)
(Continued)

(52) U.S. Cl.
CPC ........... *G01N 27/41* (2013.01); *G01N 27/409* (2013.01); *G01N 27/4067* (2013.01); *G01N 27/4071* (2013.01); *G01N 27/416* (2013.01)

(58) Field of Classification Search
CPC .... G01N 27/41; G01N 27/416; G01N 27/409; G01N 27/4071; G01N 27/4067
See application file for complete search history.

(56) References Cited

U.S. PATENT DOCUMENTS

| 6,645,361 B1 | 11/2003 | Bloemer et al. |
| 2016/0061768 A1 | 3/2016 | Nakasone et al. |

(Continued)

FOREIGN PATENT DOCUMENTS

| CN | 105474008 A | 4/2016 |
| JP | 10-019843 A | 1/1998 |

(Continued)

OTHER PUBLICATIONS

International Preliminary Report on Patentability received in corresponding International Application No. PCT/JP2017/028685 dated Feb. 21, 2019.

(Continued)

*Primary Examiner* — J. Christopher Ball
(74) *Attorney, Agent, or Firm* — Mattingly & Malur, PC

(57) ABSTRACT

A sensor element includes: a sensing cell including a sensing electrode and a reference electrode; an oxygen pump cell configured to pump out oxygen in an internal space when a predetermined voltage is applied between an inner side pump electrode formed facing to the internal space and an outer side pump electrode formed on an outer surface of the sensor element; and a heater capable of heating the sensing cell and the oxygen pump cell. The concentration of a target gas component in measurement gas is specified based on a sensor output generated at the sensing cell and a pump current at the oxygen pump cell while the heater heats the sensing cell to a temperature of 400° C. to 600° C. and heats the oxygen pump cell to a temperature of 580° C. to 850° C. determined in accordance with a diffusion resistance provided to the measurement gas by a gas introduction part.

20 Claims, 12 Drawing Sheets

(51) Int. Cl.
  *G01N 27/416* (2006.01)
  *G01N 27/406* (2006.01)
  *G01N 27/407* (2006.01)

(56) References Cited

U.S. PATENT DOCUMENTS

2016/0209354 A1    7/2016  Araki et al.
2016/0223487 A1    8/2016  Okamoto et al.
2016/0320334 A1   11/2016  Nakatou et al.

FOREIGN PATENT DOCUMENTS

| | | |
|---|---|---|
| JP | 2001-041927 A | 2/2001 |
| JP | 2002-540400 A | 11/2002 |
| JP | 2013-221931 A | 10/2013 |
| JP | 2015-135320 A | 7/2015 |
| JP | 2016-050846 A | 4/2016 |
| JP | 2016-142575 A | 8/2016 |

OTHER PUBLICATIONS

International Search Report of PCT/JP2017/028685 dated Oct. 24, 2017.
Chinese Office Action received in corresponding Chinese Application No. 201780046202.1 dated Sep. 3, 2020.

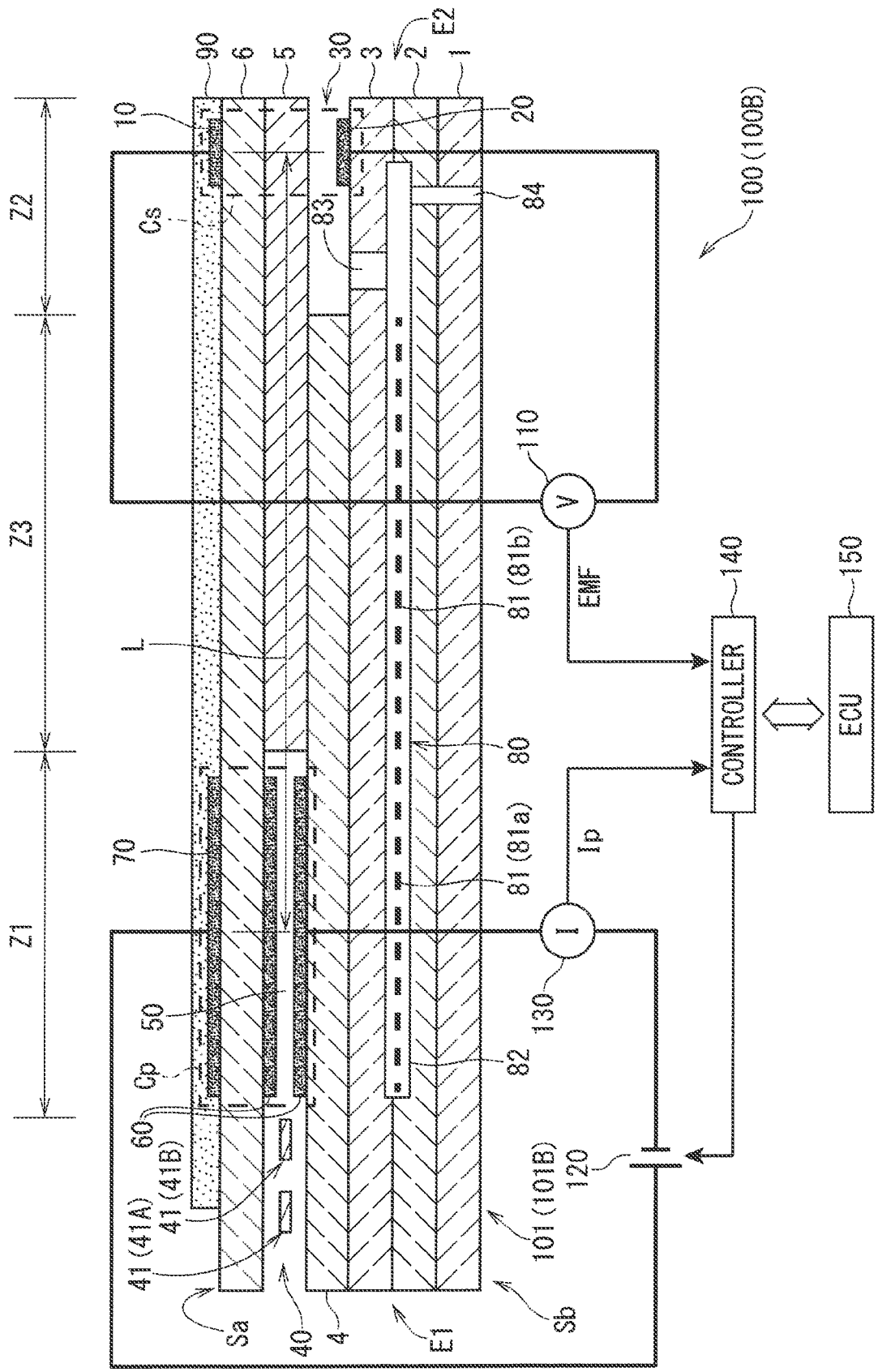

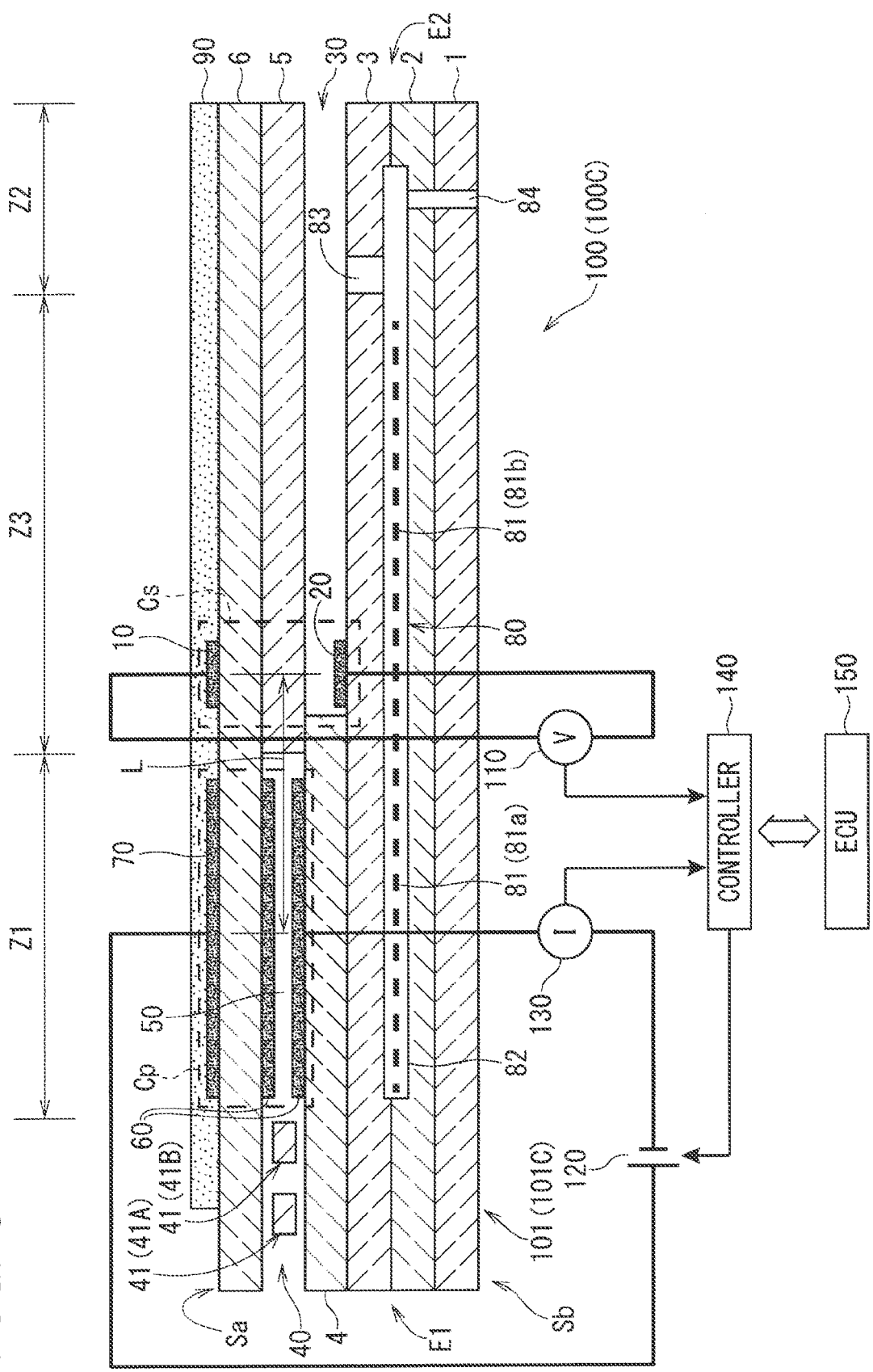

GAS SENSOR

CROSS-REFERENCE TO RELATED APPLICATION

This application is a continuation application of PCT/JP2017/028685, filed on Aug. 8, 2017, which claims the benefit of priority of Japanese Patent Application No. 2016-156298, filed on Aug. 9, 2016, the entire contents of which are incorporated herein by reference.

TECHNICAL FIELD

The present invention relates to a gas sensor configured to determine a concentration of a predetermined gas component such as hydrocarbon gas existing in measurement gas as exhaust gas from, for example, a diesel engine.

BACKGROUND ART

Gas sensors configured to detect a predetermined gas component (detection gas component) in measurement gas and determine the concentration thereof are available in various kinds of schemes. For example, a mixed-potential type gas sensor and a current detection type (limiting current type) gas sensor are already publicly known (refer to Japanese Patent Application Laid-Open No. 2016-50846, Japanese Translation of PCT International Application Publication No. 2002-540400 and Japanese Patent Application Laid-Open No. 10-19843, for example).

Japanese Patent Application Laid-Open No. 2016-50846 discloses a sensor element provided to a mixed-potential type gas sensor and including first and second internal spaces, a reference gas introduction space, a sensing electrode in the second internal space, a reference electrode in the reference gas introduction space, a first gas introduction port communicated with an external space in which measurement gas exists and communicated with the first internal space through a predetermined diffusion control part, and a second gas introduction port through which the second internal space is directly communicated with the external space. In the sensor element, the ratio D2/D1 of a value D2 of the diffusion resistance of the measurement gas between the second gas introduction port and the sensing electrode relative to a value D1 of the diffusion resistance of the measurement gas between the first gas introduction port and the sensing electrode satisfies a predetermined range so that gas inflow to the second internal space through the first gas introduction port and the first internal space is dominant over that directly through the second gas introduction port.

Japanese Translation of PCT International Application Publication No. 2002-540400 discloses a gas sensor including a sensor element usable as an NOx sensor as well as a hydrocarbon (HC) sensor including: a first measurement gas chamber including a catalytically inactive first internal electrode and a catalytically active second internal electrode that are in contact with measurement gas; a second measurement gas chamber separated from the first measurement gas chamber by an oxygen-ion transmissive layer; a reference channel into which atmospheric air is introduced; and a connection channel connecting the first measurement gas chamber and the second measurement gas chamber to the oxygen-ion transmissive layer. When used as a HC sensor, the gas sensor functions as a mixed-potential type gas sensor.

Japanese Patent Application Laid-Open No. 10-19843 discloses a gas sensor (burnable material concentration detector) constituted by stacking solid electrolyte layers including: a first cavity part including a first oxygen pump cell and an oxygen concentration measurement cell in which a solid electrolyte layer made of a thin-plate oxygen ion conductive body is sandwiched between porous electrodes; a second cavity part including a second oxygen pump cell in which a solid electrolyte layer made of a thin-plate oxygen ion conductive body is sandwiched between porous electrodes; a first diffusion path through which the first cavity part is communicated with a measurement gas side, and a second diffusion path through which the first cavity part is communicated with the second cavity part.

In the mixed-potential type sensor as disclosed in Japanese Patent Application Laid-Open No. 2016-50846, the concentration of a measurement target gas component in measurement gas can be determined based on dependency of a potential difference (sensor output) occurring between the sensing electrode and the reference electrode on the concentration of the measurement target gas component. However, it is known that the potential difference typically has large dependency on the concentration of oxygen in the measurement gas. Thus, influence of the concentration of oxygen on the sensor output needs to be taken into consideration to accurately determine the concentration of the measurement target gas component.

In the gas sensor disclosed in Japanese Patent Application Laid-Open No. 2016-50846, the sensor element is configured so that the ratio D2/D1 of the value D2 of the diffusion resistance of the measurement gas between the second gas introduction port and the sensing electrode relative to the value D1 of the diffusion resistance of the measurement gas between the first gas introduction port and the sensing electrode satisfies the predetermined range, and oxygen is pumped into or out of the first internal space by an oxygen pump cell to maintain constant the concentration of oxygen in the second internal space in which the sensing electrode exists. Accordingly, the sensor output is obtained as a value not affected by the concentration of oxygen.

The gas sensor disclosed in Japanese Patent Application Laid-Open No. 2016-50846 has no problem in accurately determining the concentration of a measurement target gas component, but has disadvantage in cost and productivity in some cases because the process of providing the second gas introduction port is essential. In addition, there are some cases that requirement for the diffusion resistance ratio D2/D1 becomes constraint on designing.

When the gas sensor disclosed in Japanese Translation of PCT International Application Publication No. 2002-540400 is used as a mixed-potential type HC sensor, the potential difference (difference value) corresponding to HC concentration can be obtained by increasing the concentration of oxygen in the first measurement gas chamber by a pump operation, and subtracting, from the potential difference between the reference electrode provided in the reference gas channel and the second internal electrode, the potential difference between the reference electrode and the first internal electrode corresponding to the concentration of oxygen in the first measurement gas chamber.

Typically, an oxygen pump cell and a mixed-potential type sensing electrode cell have different cell temperatures suitable for drive. However, in Japanese Translation of PCT International Application Publication No. 2002-540400, the temperature of each electrode is maintained substantially the same by a heater provided to the sensor element and it is described that it does not need to be individually adjusted. In such an aspect, it is difficult to simultaneously suitably drive the cells. Moreover, the sensor element disclosed in Japanese Translation of PCT International Application Publication No. 2002-540400 has a vertical structure in which the cells are stacked on the heater, and in such an element, it is difficult to adjust the temperature of each cell in a manner suitable for the cell.

Japanese Patent Application Laid-Open No. 10-19843, in which a current detection type gas sensor is disclosed, also discloses an aspect in which influence of the concentration of oxygen in measurement gas on a detected value of the concentration of burnable material is corrected based on data obtained through measurement in advance by using standard gas in which the concentration of oxygen and the concentration of burnable material are different from each other and known. However, an aspect has not been known in which measurement accuracy is increased by correcting the sensor output with taken into account influence of the concentration of oxygen in a mixed-potential type gas sensor.

SUMMARY

The present invention relates to a gas sensor configured to determine a concentration of a predetermined gas component such as hydrocarbon gas existing in measurement gas as exhaust gas from, for example, a diesel engine.

According to the present invention, a gas sensor of a mixed-potential type includes a sensor element formed of a solid electrolyte having oxygen-ion conductivity and configured to measure a concentration of a predetermined gas component in measurement gas, in which the sensor element includes: an internal space that is communicated with an external space through a gas introduction part provided on one leading end part side and to which the measurement gas is introduced from the external space; a sensing electrode provided at a part of the sensor element where the sensing electrode is contactable with the measurement gas; a reference gas introduction space to which reference gas is introduced; a reference electrode provided in the reference gas introduction space; a sensing cell including the sensing electrode and the reference electrode; an oxygen pump cell including an inner side pump electrode formed facing to the internal space, an outer side pump electrode formed on an outer surface of the sensor element, and the solid electrolyte between the inner side pump electrode and the outer side pump electrode and configured to pump out oxygen in the internal space when a predetermined oxygen pump voltage is applied between the inner side pump electrode and the outer side pump electrode; and a heater capable of heating at least the sensing cell and the oxygen pump cell, the gas sensor further includes: an oxygen pump power source configured to apply the predetermined oxygen pump voltage between the inner side pump electrode and the outer side pump electrode; and concentration specification element configured to specify the concentration of the predetermined gas component in the measurement gas, and while the measurement gas is in contact with the sensing electrode and introduced in the internal space, the heater heats the sensing cell to a first heating temperature of 400° C. or higher and 600° C. or lower and heats the oxygen pump cell to a second heating temperature of 580° C. or higher and 850° C. or lower in a temperature range determined in accordance with a diffusion resistance provided to the measurement gas by the gas introduction part, and the oxygen pump cell pumps out oxygen in the measurement gas in the internal space, the concentration specification element specifies the concentration of a measurement target gas component in the measurement gas based on: a sensor output value as a potential difference occurring between the sensing electrode and the reference electrode in accordance with the concentration of the predetermined gas component in the measurement gas; and the concentration of oxygen in the measurement gas specified based on a magnitude of a pump current flowing between the inner side pump electrode and the outer side pump electrode when oxygen in the measurement gas in the internal space is pumped out by the oxygen pump cell.

According to the present invention, a sensor output at the sensing cell and a pump current as an output in accordance with the concentration of oxygen in measurement gas, which is obtained at the oxygen pump cell can be acquired simultaneously in parallel by using the single sensor element, and thus the concentration of a detection gas component in the measurement gas can be accurately determined by performing correction based on the value of the pump current when variation occurs to the concentration of oxygen in the measurement gas at determination of the concentration of the detection gas component in the measurement gas based on the sensor output. Accordingly, influence of oxygen in the measurement gas can be excellently removed, thereby to accurately determine the concentration of the detection gas component.

Preferably, the diffusion resistance provided to the measurement gas by the gas introduction part is 500 $cm^{-1}$ or more and 900 $cm^{-1}$ or less.

With this configuration, the second heating temperature can be decreased, thereby to reduce a thermal load on the sensor element, which leads to improvement of durability of the sensor element and hence a longer lifetime of the sensor element.

The present invention therefore has an object to achieve a mixed-potential type gas sensor capable of excellently removing influence of oxygen in measurement gas to accurately determine the concentration of a detection gas component without a complicated configuration.

BRIEF DESCRIPTION OF DRAWINGS

FIG. 2 is a diagram illustrating a gas sensor 100B.

FIG. 3 is a diagram illustrating a gas sensor 100C.

DESCRIPTION OF EMBODIMENT

<Configuration of Gas Sensor>

Figure 1:
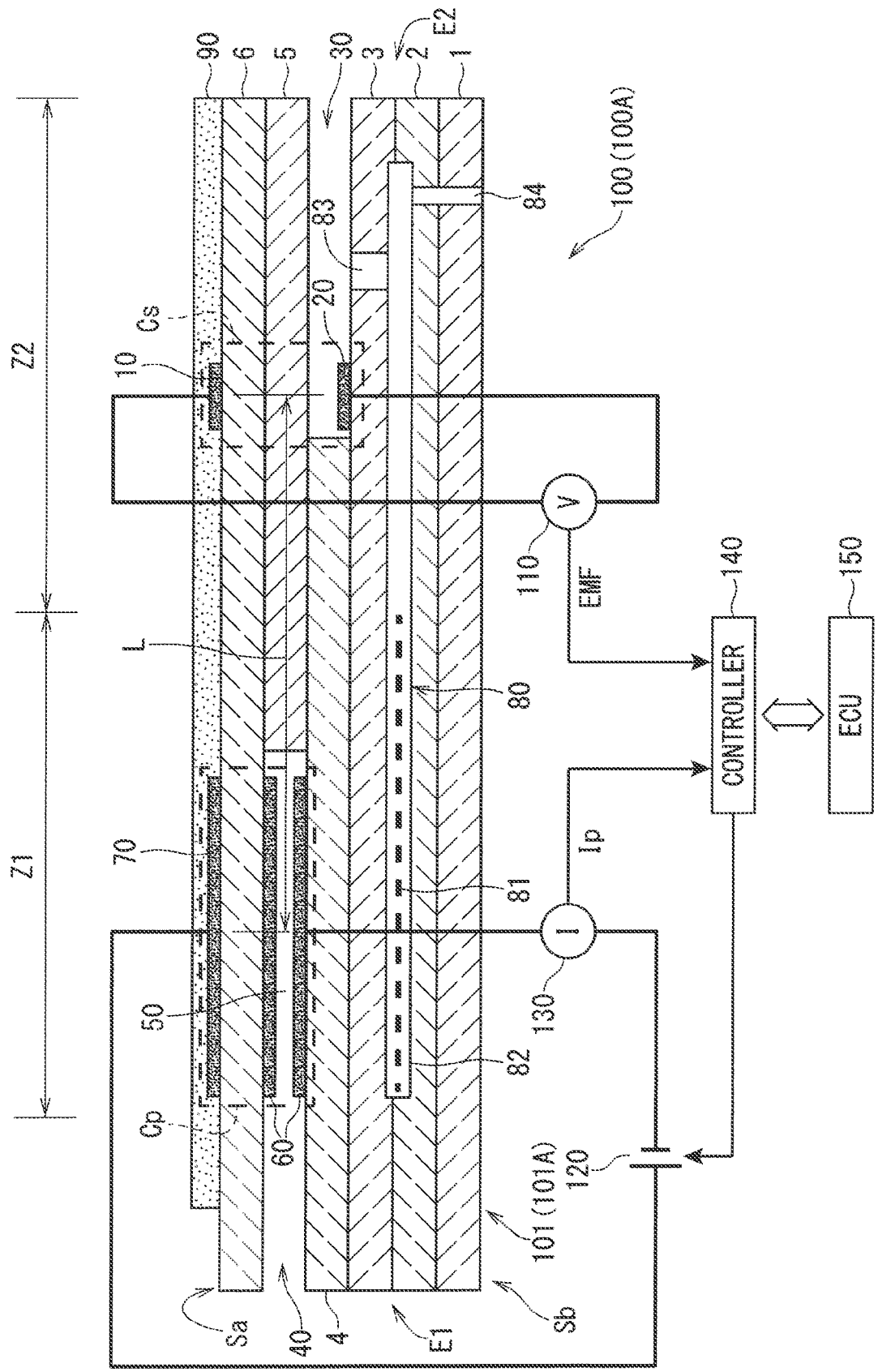
FIG. 1 is a diagram illustrating a gas sensor 100A.

FIGS. 1 to 3 are each a diagram illustrating a gas sensor 100 (100A to 100C) as an exemplary gas sensor according to an embodiment of the present invention.

The gas sensor 100 (100A to 100C) mainly includes a sensor element 101 (101A to 101C) and a controller 140 configured to control operation of the gas sensor 100 including the sensor element 101.

The gas sensor 100 is what is called a mixed-potential type gas sensor. Generally, the gas sensor 100 determines the concentration of a target gas component in measurement gas by utilizing a potential difference caused based on the principle of mixed potential by a difference in the concentration of a gas component as a measurement target between the vicinity of a sensing electrode 10 provided on a front surface of the sensor element 101 mainly made of ceramic such as zirconia ($ZrO_2$) as an oxygen-ion conductive solid electrolyte and the vicinity of a reference electrode 20 provided inside the sensor element 101.

More specifically, the gas sensor 100 is used to adequately determine the concentration of a predetermined gas component (detection gas component) in measurement gas that is exhaust gas in an exhaust pipe of an internal combustion such as a diesel engine or a gasoline engine. In a case that the detection gas component is unburned hydrocarbon gas in exhaust gas, the unburned hydrocarbon gas contains carbon monoxide (CO) in addition to typical hydrocarbon gas (classified as hydrocarbon based on a chemical formula) of $C_2H_4$, $C_3H_6$, n-C8, and the like. However, another kind of gas may be a measurement target. In this case, control of the gas sensor 100 by the controller 140 is performed based on a control instruction from an electronic control unit (ECU) 150 configured to control the entire internal combustion.

The sensor elements 101 (101A to 101C) illustrated in FIGS. 1 to 3 each have an elongated plate shape or a bar shape and mainly include, in addition to the sensing electrode 10 and the reference electrode 20 described above, a reference gas introduction space 30, a gas introduction part 40, an internal space 50, an inner side pump electrode 60, and an outer side pump electrode 70. However, some components are disposed differently between the sensor elements 101A to 101C. This will be described in detail later.

The sensor element 101 has a structure in which six layers of a first solid electrolyte layer 1, a second solid electrolyte layer 2, a third solid electrolyte layer 3, a fourth solid electrolyte layer 4, a fifth solid electrolyte layer 5, and a sixth solid electrolyte layer 6, which are made of an oxygen-ion conductive solid electrolyte, are laminated in the stated order from the bottom side in the drawings, and additionally includes other components mainly between the layers or on an outer peripheral surface of the element. The solid electrolyte of which the six layers are made is fully airtight. The sensor element 101 is manufactured by, for example, performing predetermined processing and electrode and circuit pattern printing on a ceramic green sheet corresponding to each layer, stacking the ceramic green sheets, and integrating the ceramic green sheets by firing.

However, it is not essential that the gas sensor 100 includes the sensor element 101 as such a six-layer laminated body. The sensor element 101 may be formed as a laminated body having a larger or smaller number of layers, or may have no laminated structure.

For sake of simplicity in the following description, in the drawings, a surface positioned above the sixth solid electrolyte layer 6 is referred to as a front surface Sa of the sensor element 101, and a surface positioned below the first solid electrolyte layer 1 is referred to as a back surface Sb of the sensor element 101. When the concentration of the detection gas component in the measurement gas is to be determined by using the gas sensor 100, a predetermined range extending from a leading end part E1 as one end part of the sensor element 101 and including at least the sensing electrode 10 is disposed in a measurement gas atmosphere, and the remaining part including a base end part E2 as the other end part is disposed not in contact with the measurement gas atmosphere.

In the sensor element 101, a sensing cell Cs as a mixed potential cell is constituted by the sensing electrode 10, the reference electrode 20, and the solid electrolyte between the electrodes.

The sensing electrode 10 is an electrode to detect the measurement gas. The sensing electrode 10 is formed as a porous cermet electrode made of Pt containing Au at a predetermined ratio, in other words, a Pt—Au alloy, and zirconia. The sensing electrode 10 is provided on the front surface Sa of the sensor element 101. However, the specific layout position of the sensing electrode 10 in the longitudinal direction (hereinafter referred to as an element longitudinal direction) of the sensor element 101 as the right and left direction in the drawings differs between the sensor elements 101A to 101C. This corresponds to the layout position of the sensing cell Cs which is variously set. The layout position of the sensing cell Cs will be described in detail later. The sensing electrode 10 is formed in a substantially rectangular shape in plan view. When used, the gas sensor 100 is disposed so that part of the sensor element 101 up to at least a part where the sensing electrode 10 is provided is exposed in the measurement gas.

The catalytic activity of the sensing electrode 10 for the detection gas component is disabled in a predetermined concentration range by properly determining the composition of the Pt—Au alloy as the material of the sensing electrode 10. In other words, decomposition reaction of the detection gas component at the sensing electrode 10 is suppressed. Accordingly, in the gas sensor 100, the potential of the sensing electrode 10 varies selectively for the detection gas component in accordance with (in correlation with) the concentration of the detection gas component. In other words, the sensing electrode 10 has such a characteristic that the potential thereof has high concentration dependency on the detection gas component in a predetermined concentration range but has small concentration dependency on any other component of the measurement gas.

For example, when the detection gas component is unburned hydrocarbon gas in exhaust gas, the sensing electrode 10 is formed to have an Au abundance ratio of 0.3 to 2.5 and thus have significant potential concentration dependency in the unburned hydrocarbon gas concentration range of 0 ppmC to 4000 ppmC approximately.

In the specification, the Au abundance ratio is the area ratio of a part covered by Au relative to a part at which Pt is exposed on the surface of a noble metal particle included in the sensing electrode 10. In the specification, the Au abundance ratio is calculated by a relative sensitivity coefficient method based on the peak intensities of Au and Pt at detection peaks, which can be obtained by X-ray photoelectron spectroscopy (XPS). The Au abundance ratio is 1 when the area of the part at which Pt is exposed is equal to the area of the part covered by Au.

Conductive paste used to form the sensing electrode 10 by printing can be prepared by using Au ion-containing liquid as an Au starting raw material and mixing the Au ion-containing liquid with Pt powder, zirconia powder, and a binder. Any binder may be appropriately selected, as long as it can disperse any other raw material to an extent appropriate for printing and is burned out by firing.

The Au ion-containing liquid is obtained by dissolving a salt containing an Au ion or an organometallic complex containing an Au ion in a solvent. The Au ion-containing salt may be, for example, tetrachloroauric(III) acid ($HAuCl_4$), sodium chloroaurate(III) ($NaAuCl_4$), or potassium dicyanoaurate(I) ($KAu(CN)_2$). The Au ion-containing organometallic complex may be, for example, gold(III) diethylenediamine trichloride ($[Au(en)_2]Cl_3$), gold(III) dichloro(1,10-phenanthroline)chloride ($[Au(phen)Cl_2]Cl$), dimethyl (trifluoroacetylacetonate)gold, or dimethyl (hexafluoroacetylacetonate)gold. Tetrachloroauric(III) acid or gold(III) diethylenediamine trichloride ($[Au(en)_2]Cl_3$) is preferably used from the viewpoint of no impurity such as Na or K remaining in the electrode, easy handling, or dissolvability in the solvent. The solvent may be acetone, acetonitrile, or formamide as well as alcohols such as methanol, ethanol, and propanol.

Mixing can be performed by well-known means such as instillation. Although the obtained conductive paste contains Au present in ionic (complex ionic) state, the sensing electrode 10 formed in the sensor element 101 obtained through the above-mentioned manufacturing process contains Au mainly as an elemental substrate or an alloy with Pt.

Alternatively, the conductive paste for the sensing electrode may be prepared by using coated powder, which is obtained by coating powdered Pt with Au, as an Au starting raw material. In such a case, a conductive paste for the sensing electrode is prepared by mixing the coated powder, zirconia powder, and a binder. Here, the coated powder may be obtained by covering the particle surface of powdered Pt with an Au film or applying Au particles to Pt powder particles.

The reference electrode 20 having a substantially rectangular shape in plan view, is provided inside the sensor element 101A, and serves as a reference for determining the concentration of the measurement gas. The reference electrode 20 is formed as a porous cermet electrode of Pt and zirconia.

More specifically, the reference electrode 20 is provided in the reference gas introduction space 30 at a position below the sensing electrode 10 in a thickness direction of the sensor element 101 (stacking direction of the solid electrolyte layers) in plan view of the sensor element 101 from the front surface Sa side. However, the specific layout position of the reference electrode 20 in the element longitudinal direction differs in accordance with the layout position of the sensing electrode 10. Similarly to the case of the sensing electrode 10, this corresponds to the layout position of the sensing cell Cs which is variously set.

The reference electrode 20 may be formed to have a porosity of 10% or more and 30% or less and a thickness of 5 m or more and 15 m or less. The reference electrode 20 may have a plane size equivalent to or smaller than that of the sensing electrode 10. Although the reference electrode 20 is formed below the reference gas introduction space 30 in FIGS. 1 to 3, the reference electrode 20 may be formed above the reference gas introduction space 30.

The reference gas introduction space 30 is an internal space provided on the base end part E2 side of the sensor element 101. Air (oxygen) as reference gas for determining the concentration of the detection gas component is introduced into the reference gas introduction space 30 from the outside.

In the configurations exemplarily illustrated in FIGS. 1 to 3, the reference gas introduction space 30 is provided in a way that a space which is communicated with the outside is allowed in part of the fourth solid electrolyte layer 4 on the base end part E2 side of the sensor element 101. More specifically, an upper part and a lower part of the reference gas introduction space 30 in the drawings are defined by the third solid electrolyte layer 3 and the fifth solid electrolyte layer 5, and a side part thereof is defined by the fourth solid electrolyte layer 4.

When the gas sensor 100 is used, a space around the reference electrode 20 provided to the reference gas introduction space 30 is always filled with air (oxygen). Thus, the reference electrode 20 constantly has a constant potential when the gas sensor 100 is used.

The reference gas introduction space 30 is prevented from contacting with the measurement gas by the solid electrolyte surrounding the space, and thus the reference electrode 20 does not contact with the measurement gas when the sensing electrode 10 is exposed to the measurement gas.

While the potential of the reference electrode 20 is constant, the potential of the sensing electrode 10 depends on the concentration of the detection gas component as described above. Thus, in the sensing cell Cs, a potential difference occurs between the sensing electrode 10 and the reference electrode 20 in accordance with the concentration of the detection gas component. This potential difference is measured by a potentiometer 110 provided to the gas sensor 100.

FIGS. 1 to 3 schematically illustrate wiring between the potentiometer 110 and each of the sensing electrode 10 and the reference electrode 20. However, in the sensor element 101 in reality, a connection terminal (not illustrated) corresponding to each electrode is provided on the front surface Sa or the back surface Sb on the base end part E2 side, and a wiring pattern (not illustrated) connecting each electrode and the corresponding connection terminal is formed on the front surface Sa and inside the element. The potentiometer 110 and each of the sensing electrode 10 and the reference electrode 20 are electrically connected with each other through the wiring pattern and the connection terminal.

Hereinafter, the potential difference between the sensing electrode 10 and the reference electrode 20 measured by the potentiometer 110 is also referred to as a sensor output EMF or simply referred to as EMF.

The sensor element 101 also includes the gas introduction part 40 having an opening at the leading end part E1, and the internal space 50 communicated with an external space through the gas introduction part 40. The measurement gas outside of the sensor element 101 is provided with a predetermined diffusion resistance by the gas introduction part 40 and introduced to the internal space 50. In the configurations exemplarily illustrated in FIGS. 1 to 3, an upper part and a lower part of each of the gas introduction part 40 and the internal space 50 are defined by the fourth solid electrolyte layer 4 and the sixth solid electrolyte layer 6, and a side part thereof is defined by the fifth solid electrolyte layer 5.

Figure 4A:
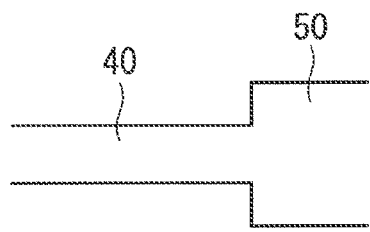
FIGS. 4A to 4E are diagrams exemplarily illustrating various kinds of configurations applicable to a gas introduction part 40.
Figure 4B:
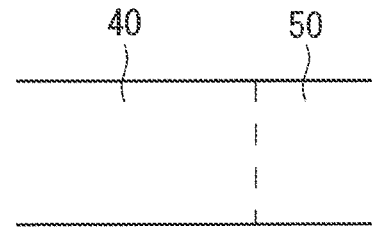

Various kinds of configurations are adoptable for the gas introduction part 40 as long as they can provide a desired diffusion resistance to the measurement gas. FIGS. 4A to 4E are diagrams exemplarily illustrating various kinds of configurations applicable to the gas introduction part 40. For example, FIG. 4A is a plan view of the gas introduction part 40 of the sensor element 101A illustrated in FIG. 1. The gas introduction part 40 of the sensor element 101A has a size (width) smaller than a size (width) of the internal space 50 in a width direction (direction orthogonal to the element longitudinal direction on a surface perpendicular to the thickness direction). FIG. 4B is a plan view exemplarily illustrating a case in which the gas introduction part 40 has a size same as the size of the internal space 50 in the width direction of the sensor element 101. The configuration illustrated in FIG. 4B can achieve a diffusion resistance same as that of the configuration illustrated in FIG. 4A by appropriately setting the size of the gas introduction part 40.

Figure 4C:
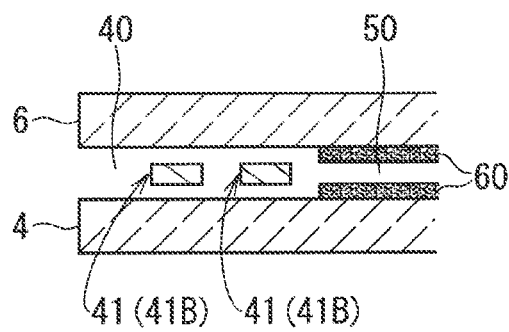
Figure 4D:
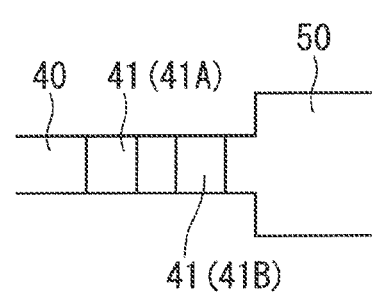

FIG. 4C is a partial diagram of the gas introduction part 40 of the sensor element 101B illustrated in FIG. 2, and FIG. 4D is a plan view of the gas introduction part 40 of the sensor element 101B. The gas introduction part 40 of the sensor element 101B includes two diffusion control parts 41 (41A and 41B). In the configurations illustrated in FIGS. 2, 4C, and 4D, the diffusion control parts 41 are provided as two horizontally long slits (the openings thereof each have a longitudinal direction in the width direction of the sensor element 101).

Figure 4E:
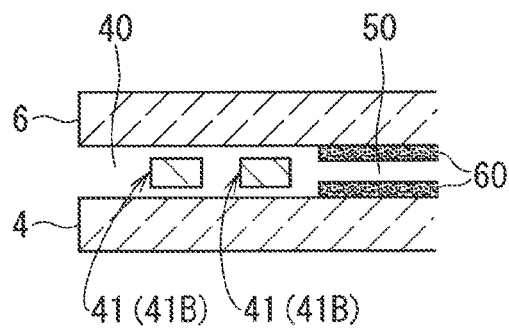

FIG. 4E is a partial diagram of the gas introduction part 40 of the sensor element 101C illustrated in FIG. 3. The gas introduction part 40 of the sensor element 101C includes a diffusion control part 41 having an opening the thickness of which is small as compared to those of the gas introduction part 40 of the sensor element 101B. This means that the gas introduction part 40 provides a larger diffusion resistance to the measurement gas in the sensor element 101C compared to a case in the sensor element 101B.

Although FIGS. 2, 3, and 4C to 4E exemplarily illustrate the configurations in which the gas introduction part 40 includes the two diffusion control parts 41 (41A and 41B), the number of diffusion control parts included in the gas introduction part 40 is not limited to two. Alternatively, the measurement gas may be provided with a desired diffusion resistance by entirely or partially providing a porous diffusion control part to the gas introduction part 40 instead of providing a diffusion control part in a slit shape.

As just described, the diffusion resistance of the gas introduction part 40 is adjusted to a desired value based on the size of the gas introduction part 40 or diffusion control parts provided in various kinds of aspects in the gas introduction part 40.

The inner side pump electrode 60 is provided in the internal space 50 into which the measurement gas is introduced at a predetermined diffusion resistance. The inner side pump electrode 60 is formed at least at a bottom part of the sixth solid electrolyte layer 6 as the top surface of the internal space 50 in the drawings. FIGS. 1 to 3 each exemplarily illustrate an aspect in which the inner side pump electrode 60 is provided on all four surfaces (in other words, in a tunnel shape) along the element longitudinal direction.

The inner side pump electrode 60 is formed as a porous cermet electrode (for example, a cermet electrode made of Pt containing Au of 1% and zirconia). The inner side pump electrode 60 may be formed to have a porosity of 10% or more and 30% or less and a thickness of 5 μm or more and 15 μm or less.

The outer side pump electrode 70 is provided at a position on the front surface Sa of the sensor element 101 above the inner side pump electrode 60 in the thickness direction of the sensor element 101 in plan view of the sensor element 101 from the front surface Sa side.

Similarly to the inner side pump electrode 60, the outer side pump electrode 70 is formed as a porous cermet electrode (for example, a cermet electrode made of Pt containing Au of 1% and zirconia). The outer side pump electrode 70 may be formed to have a porosity of 10% or more and 30% or less and a thickness of 5 μm or more and 15 m or less. The outer side pump electrode 70 has a plane size equivalent to that of the inner side pump electrode 60.

In the sensor element 101, an oxygen pump cell Cp as an electrochemical pump cell is constituted by the inner side pump electrode 60, the outer side pump electrode 70, and the solid electrolyte between the electrodes. The oxygen pump cell Cp is provided to pump out, to the outside of the element, oxygen contained in the measurement gas introduced to the internal space 50 through the gas introduction part 40. Specifically, when a predetermined voltage is applied between the inner side pump electrode 60 and the outer side pump electrode 70 by a pump power source 120 provided to the gas sensor 100, oxygen in the measurement gas is ionized at the inner side pump electrode 60, moves in the solid electrolyte, and is discharged from the outer side pump electrode 70 to the outside of the element. In this case, current (limiting current) flowing between the inner side pump electrode 60 and the outer side pump electrode 70 is proportional to the concentration of oxygen in the measurement gas. The value of the current is measured by an ammeter 130 provided to the gas sensor 100.

Wiring between each of the inner side pump electrode 60 and the outer side pump electrode 70 and each of the pump power source 120 and the ammeter 130 is illustrated in a simplified manner in FIGS. 1 to 3. However, in the sensor element 101 in reality, a connection terminal (not illustrated) is provided on the front surface Sa or the back surface Sb on the base end part E2 side in a manner corresponding to each electrode, and a wiring pattern (not illustrated) connecting each electrode and the corresponding connection terminal is formed on the front surface Sa and inside the element. Each of the inner side pump electrode 60 and the outer side pump electrode 70 and each of the pump power source 120 and the ammeter 130 are electrically connected with each other through the wiring pattern and the connection terminal.

Hereinafter, the current flowing between the inner side pump electrode 60 and the outer side pump electrode 70 and measured by the ammeter 130 is also referred to as oxygen pump current Ip. The oxygen pump current Ip can be regarded as a linear function of the concentration of oxygen in the measurement gas. The value of the oxygen pump current Ip measured by the ammeter 130 is used to correct the concentration of the detection gas component calculated based on the sensor output EMF.

The sensor element 101 further includes a heater part 80. The heater part 80 mainly includes a heater 81, a heater insulating layer 82, and a pressure diffusion hole 83.

The heater 81 is formed being vertically sandwiched between the second solid electrolyte layer 2 and the third solid electrolyte layer 3. The heater 81 meanders (in a meander shape) in the element longitudinal direction. The heater 81 is disposed to include, in the element longitudinal direction, at least the existence range of the oxygen pump cell Cp in the element longitudinal direction. In other words, the heater 81 is disposed at least below the oxygen pump cell Cp in plan view of the sensor element 101 from the front surface Sa side.

The heater 81 provided to each of the sensor elements 101B and 101C illustrated in FIGS. 2 and 3 has a larger existence range in the element longitudinal direction than that of the heater 81 provided to the sensor element 101A illustrated in FIG. 1, and includes, in addition to a main heat generation part 81A provided in a range substantially equal to the existence range of the oxygen pump cell Cp in the element longitudinal direction, a sub heat generation part 81B having reduced heat generation performance as compared to that of the main heat generation part 81A. This is achieved by, for example, differentiating the sizes and materials of heat generation bodies included in the heat generation parts or differentiating the wiring densities of the heat generation parts.

The heater insulating layer 82 is provided between each of the second solid electrolyte layer 2 and the third solid electrolyte layer 3 and the heater 81 to achieve electric insulation of each of the second solid electrolyte layer 2 and the third solid electrolyte layer 3 from the heater 81. The heater insulating layer 82 is made of, for example, alumina.

The heater 81 generates heat by receiving power supply from the outside through a heater electrode (not illustrated) provided on the back surface Sb (lower surface of the first solid electrolyte layer 1 in the drawing) of the sensor element 101. The heater electrode and the heater 81 are electrically connected with each other through a heater lead (not illustrated) disposed inside the heater insulating layer 82 and inside a through-hole 84 penetrating from the heater insulating layer 82 to the back surface Sb. The power supply to the heater 81 is controlled by the controller 140 based on a control instruction from the ECU 150.

The pressure diffusion hole 83 is a site formed to penetrate through the third solid electrolyte layer 3 and communicate the heater insulating layer 82 and the reference gas introduction space 30, and provided to reduce internal pressure increase due to temperature increase in the heater insulating layer 82.

In the gas sensor 100, when the concentration of the detection gas component is to be obtained, the heater 81 generates heat to heat each component of the sensor element 101 to a temperature suitable for operation and keep the temperature. Thus, the sensing cell Cs and the oxygen pump cell Cp are each heated to a temperature in a temperature range in which the respective cells suitably operate. However, the temperature ranges in which the respective cells suitably operate are different from each other. Specifically, the sensing cell Cs is heated to a first heating temperature (T1) satisfying a first temperature range of 400° C. or higher and 600° C. or lower, preferably 450° C. or higher and 550° C. or lower. The oxygen pump cell Cp is heated to a second heating temperature (T2) satisfying a second temperature range of at least 580° C. or higher and 850° C. or lower. The heating temperatures hold the relation T1<T2.

In the gas sensor 100, the disposition relation between the sensing cell Cs and the oxygen pump cell Cp, the existence range of the heater, the disposition relation between the sensing cell Cs and the heater 81, and the manner of heating by the heater 81 are determined so that the first temperature range and the second temperature range are suitably achieved at the layout positions of the sensing cell Cs and the oxygen pump cell Cp, respectively.

However, these specific aspects are not limited to a single combination, but may have various kinds of variations. For example, in the sensor elements 101A to 101C illustrated in FIGS. 1 to 3, the oxygen pump cell Cp is disposed at the same position, and the existence range of the heater 81 in the element longitudinal direction includes at least the existence range of the oxygen pump cell Cp in the element longitudinal direction, but the distance between the oxygen pump cell Cp and the sensing cell Cs and the disposition range of the heater 81 in the element longitudinal direction are different between the sensor elements. Variations of the configuration of the sensor element 101 will be described in detail later.

In the present embodiment, the temperature of the sensing cell Cs is evaluated based on the surface temperature of the sensing electrode 10, and the temperature of the oxygen pump cell Cp is evaluated based on the surface temperature of the outer side pump electrode 70. The surface temperatures of these electrodes can be evaluated by infrared thermography.

The sensor element 101 also includes a surface protective layer 90. The surface protective layer 90 is a porous layer made of alumina and provided to cover at least the sensing electrode 10 and the outer side pump electrode 70 on the front surface Sa of the sensor element 101. The surface protective layer 90 is provided as an electrode protective layer that reduces degradation of the sensing electrode 10 and the outer side pump electrode 70 due to continuous exposure to the measurement gas when the gas sensor 100 is used. The surface protective layer 90 is provided in aspects (pore size, porosity, and thickness) that do not limit reach of the measurement gas to the sensing electrode 10 and discharge of oxygen from the outer side pump electrode 70 in effect.

In the configurations exemplarily illustrated in FIGS. 1 to 3, the surface protective layer 90 is provided to cover not only the sensing electrode 10 and the outer side pump electrode 70 but also substantially all parts of the front surface Sa of the sensor element 101 except for a predetermined range from the leading end part E1.

In the gas sensor 100 having the above-described configuration, the sensor output EMF at the sensing cell Cs and the oxygen pump current Ip flowing through the oxygen pump cell Cp are output to the controller 140 configured to control operation of the gas sensor 100. These output values provided to the controller 140 are further provided to the ECU 150, and then the ECU 150 performs arithmetic processing based on these outputs to calculate the concentration of the detection gas component near the sensor element 101. In other words, the ECU 150 also functions as concentration specification means configured to specify the concentration of the detection gas component.

<Process of Manufacturing Sensor Element>

The following describes the outline of the process of manufacturing the sensor element 101. Generally, the sensor element 101 is manufactured, irrespective of difference in the specific configuration thereof, by forming a laminated body formed of green sheets containing, as a ceramic component, an oxygen-ion conductive solid electrolyte such as zirconia and cutting and firing the laminated body. Examples of the oxygen-ion conductive solid electrolyte include yttrium partially stabilized zirconia (YSZ).

Figure 5:
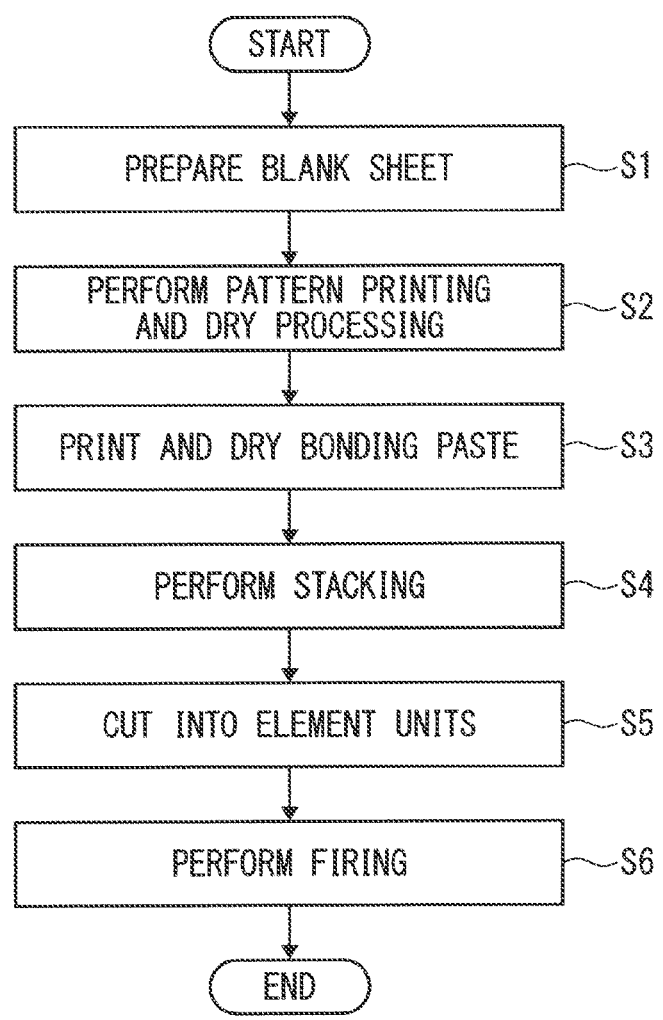
FIG. 5 is a diagram illustrating a flow of the process of producing a sensor element 101.

FIG. 5 is a diagram illustrating a flow of the process of manufacturing the sensor element 101. First, blank sheets (not illustrated) as green sheets on which no pattern is formed are prepared (step S1). Specifically, six blank sheets corresponding to the first solid electrolyte layer 1, the second solid electrolyte layer 2, the third solid electrolyte layer 3, the fourth solid electrolyte layer 4, the fifth solid electrolyte layer 5, and the sixth solid electrolyte layer 6 are prepared. In addition, a blank sheet for forming the surface protective layer 90 is prepared. Each blank sheet is provided with a plurality of sheet holes for positioning at printing and stacking and other purposes in advance. The sheet holes are formed in advance through, for example, punching processing by a punching apparatus. For green sheets, the corresponding layers of which are the reference gas introduction space 30, the gas introduction part 40, and the internal space 50, penetrating parts corresponding to these internal spaces are also provided in advance through, for example, the same punching processing. All blank sheets corresponding to the respective layers of the sensor element 101 do not need to have identical thicknesses.

After the blank sheets corresponding to the respective layers are prepared, pattern printing and dry processing are performed to form various kinds of patterns on each blank sheet (step S2). Specifically, electrode patterns of, for example, the sensing electrode 10, the reference electrode 20, the inner side pump electrode 60, and the outer side pump electrode 70, patterns forming the heater 81 and the heater insulating layer 82, and patterns for forming an internal wire such as the heater lead (not illustrated) are formed by printing. When the diffusion control parts 41 in a slit shape are formed in the gas introduction part 40, pattern formation by using paste containing a low-temperature decomposition material that decomposes at firing (decomposes at the firing temperature) in postprocessing (step S6) is performed at the forming positions of the diffusion control parts 41. Examples of the low-temperature decomposition material include theobromine and carbon. In addition, a cut mark used as a reference for a cutting position when the laminated body is cut in the postprocessing is printed on the first solid electrolyte layer 1.

Each pattern is printed by applying pattern forming paste (such as conductive paste) prepared in accordance with characteristics requested for each formation target, onto a blank sheet by using a well-known screen printing technology. Well-known drying means may be employed for the dry processing after the printing.

After the pattern printing ends, printing and dry processing are performed, for bonding paste used to stack and bond the green sheets corresponding to the respective layers (step S3). The printing of the bonding paste may employ a well-known screen printing technology, and the dry processing after the printing may employ well-known drying means.

Subsequently, press bonding processing is performed in which the green sheets on the bonding agent is applied are stacked in a predetermined order and bonded by pressing under predetermined temperature and pressure conditions to form one laminated body (step S4). Specifically, the green sheets as laminating targets are stacked and held on a predetermined laminating jig (not illustrated) through positioning with reference to the sheet holes, and then heated and pressurized together with the laminating jig by a laminator such as a well-known hydraulic pressure press machine. Pressure, temperature, and time with which the heating and the pressurization are performed depend on the laminator in use, but appropriate conditions may be determined to achieve favorable lamination.

After the laminated body is obtained as described above, the laminated body is subsequently divided into individual parts (referred to as element bodies) of the sensor element 101 through cutting at a plurality of places (step S5). The divided element bodies are fired under a predetermined condition (step S6). Specifically, the sensor element 101 is generated through integration firing of solid electrolyte layers and electrodes. The temperature of the firing is preferably 1200° C. or higher and 1500° C. or lower (for example, 1365° C.). Due to performing the integration firing in this manner, each electrode in the sensor element 101 has sufficient adhesion strength.

The sensor element 101 obtained in this manner is housed in a predetermined housing and incorporated in the body (not illustrated) of the gas sensor 100.

<Calculation of Detection Gas Component Concentration>

When the concentration of the detection gas component in the measurement gas is determined by using the gas sensor 100, only the predetermined range of the sensor element 101 extending from the leading end part E1 and including at least the sensing electrode 10 is disposed in a space in which the measurement gas exists as described above, whereas the base end part E2 side is disposed in isolation from the space, and then air (oxygen) is supplied to the reference gas introduction space 30. Then, the sensor element 101 is heated by the heater 81 so that the sensing cell Cs is heated to the first heating temperature and the oxygen pump cell Cp is heated to the second heating temperature.

In this state, as described above, the potential of the reference electrode 20 disposed under air (with constant oxygen concentration) atmosphere is maintained constant, but the potential of the sensing electrode 10 has concentration dependency on the detection gas component in the measurement gas. Thus, a potential difference occurs between the sensing electrode 10 and the reference electrode 20 in accordance with the concentration of the detection gas component. Then, the potential difference is output as the sensor output EMF.

Therefore, a certain functional relation (referred to as a sensitivity characteristic) intrinsically holds between the concentration of the detection gas component and the sensor output EMF. Thus, in principle, once the sensitivity characteristic is experimentally specified in advance by using, as measurement gasses, a plurality of mutually different mixed gasses containing the detection gas component at known concentrations and measuring the sensor output EMF for each mixed gas, and is stored in the ECU 150, the concentration of the detection gas component can be determined by matching the value of the sensor output EMF, which momentarily changes in accordance with the concentration of the detection gas component in the measurement gas, against the sensitivity characteristic, when the gas sensor 100 is actually used.

Figure 6:
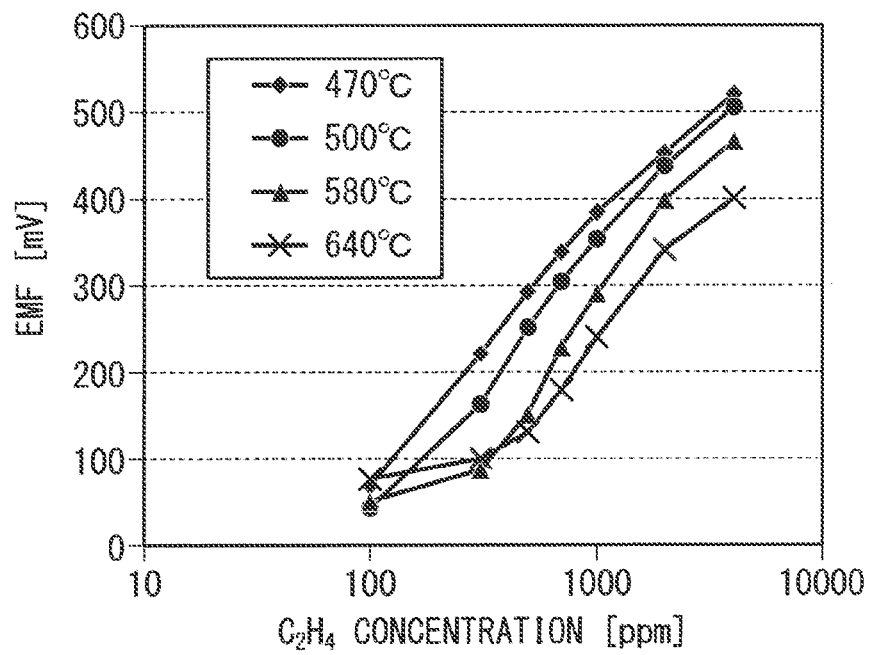
FIG. 6 is a diagram exemplarily illustrating a sensitivity characteristic of a sensing cell Cs.

FIG. 6 is a diagram exemplarily illustrating the sensitivity characteristic of the sensing cell Cs. More specifically, FIG. 6 illustrates the sensitivity characteristic of the sensor element 101A having the configuration illustrated in FIG. 1 to a plurality of model gasses each containing $C_2H_4$ as the detection gas component at any of 100 ppm, 300 ppm, 500 ppm, 700 ppm, 1000 ppm, 2000 ppm, and 4000 ppm, oxygen at 10%, water vapor at 5%, and nitrogen as the balance for the first heating temperature at each of four different levels of 470° C., 500° C., 580° C., and 640° C. FIG. 6 indicates that the sensor output EMF linearly changes in accordance with the concentration of $C_2H_4$ and the sensitivity characteristic is suitably obtained when the first heating temperature is 470° C. or 500° C., but the sensor output has no concentration dependency in a low concentration range when the first heating temperature is 640° C. This result indicates that, as described above, it is preferable to set the first heating temperature in the first temperature range of 400° C. or higher and 600° C. or lower, preferably 450° C. or higher and 550° C. or lower.

Figure 7:
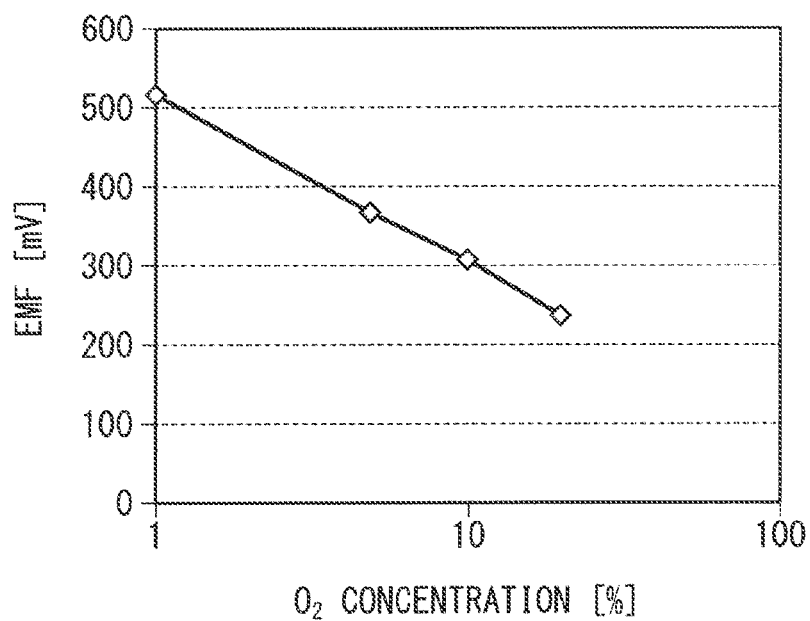
FIG. 7 is a diagram exemplarily illustrating dependency of a sensor output EMF on the concentration of oxygen in measurement gas.

However, the sensitivity characteristic illustrated in FIG. 6 is obtained under the condition that the concentration of oxygen is constant, but in reality, mixed potential occurring to the sensing electrode 10 changes in accordance with the concentration of oxygen in the measurement gas, and thus the value of the sensor output EMF changes depending on the concentration of oxygen in the measurement gas. FIG. 7 is a diagram exemplarily illustrating dependency of the sensor output EMF on the concentration of oxygen in the measurement gas. More specifically, FIG. 7 illustrates change of the sensor output EMF of the sensor element 101A having the configuration illustrated in FIG. 1 to a plurality of model gasses each containing $C_2H_4$ as the detection gas component at 1000 ppm, oxygen at any of 1%, 5%, 10%, and 20%, water vapor at 5%, and nitrogen as the balance for the first heating temperature at 500° C.

Since the detection gas component is constant, the sensor output EMF should be maintained constant independently from the concentration of oxygen in principle, but in reality, the sensor output EMF changes depending on the concentration of oxygen as illustrated in FIG. 7. Thus, in the gas sensor 100, correction is performed by using the value of the oxygen pump current Ip, which takes a value in accordance with the concentration of oxygen in the measurement gas, in order to increase the accuracy of calculation of the concentration of the detection gas component. The specific method of the correction is achieved in, for example, the following two aspects.

(First Aspect)

In this aspect, a plurality of mixed gases in which not only the concentration of the detection gas component but also the concentration of oxygen is differentiated at levels are used in the above-described sensitivity characteristic specification, and the value of the oxygen pump current Ip or the concentration of oxygen corresponding to the value is included as a parameter of the sensitivity characteristic.

Specifically, a sensitivity characteristic map indicating the relation among the concentration of the detection gas component, the oxygen pump current Ip, and the sensor output EMF is experimentally specified by using, as measurement gasses, a plurality of mutually different mixed gasses in each of which the concentration of the detection gas component and the concentration of oxygen are known and measuring the sensor output EMF and the oxygen pump current Ip for each measurement gas, and the sensitivity characteristic map is stored in the ECU 150. Then, when the gas sensor 100 is actually used, the concentration of the detection gas component can be determined by matching the value of the sensor output EMF and the oxygen pump current Ip against the sensitivity characteristic map to specify the value of the corresponding concentration of the detection gas component.

Accordingly, the concentration of the detection gas component in the measurement gas can be determined substantially in real time.

(Second Aspect)

In this aspect, the concentration of the detection gas component is calculated based on Expression (1) as a theoretical formula expressing a mixed potential mechanism and the value of the concentration of oxygen in the measurement gas, which is specified based on the oxygen pump current Ip.

[Expression 1]

$$E_{MIX} = E_0 + m\frac{RT}{(4\alpha_{O2} + 2\alpha_{C0})F}\ln C_{O2} - n\frac{RT}{(4\alpha_{O2} + 2\alpha_{C0})F}\ln C_x \quad (1)$$

In Expression (1), $C_{O2}$ represents the concentration of oxygen in the measurement gas, $C_x$ represents the concentration of the detection gas component in the measurement gas, and $E_{MIX}$ represents the sensor output EMF. In addition, R represents the gas constant, T represents the temperature of the sensing cell Cs, and F represents the Faraday constant. The other parameters are known constants. The concentration of oxygen in the measurement gas can be determined from the oxygen pump current Ip, and thus the concentration of the detection gas component in the measurement gas can be determined by calculating the value of $C_x$ from the values of $C_{O2}$ and $E_{MIX}$ based on Expression (1).

<Disposition of Cell and Heater and Heating Temperature>

As described above, in the gas sensor 100, in order to suitably operate the sensing cell Cs and the oxygen pump cell Cp, the sensing cell Cs is heated to the first heating temperature (T1) satisfying the first temperature range, and the oxygen pump cell Cp is heated to the second heating temperature (T2) satisfying the second temperature range. This is achieved by adequately determining the disposition relation among the sensing cell Cs, the oxygen pump cell Cp, and the heater 81, and the manner of heating by the heater 81, and the specific manner thereof may have various kinds of variations.

The following describes, among the variations, a configuration in which the disposition range of the heater 81 in the element longitudinal direction includes at least the existence range of the oxygen pump cell Cp in the element longitudinal direction as in the configurations of the sensor elements 101A to 101C illustrated in FIGS. 1 to 3.

The configuration has advantage in easy control of the temperature of the oxygen pump cell Cp, which is required to be heated to a highest temperature in the sensor element 101. Specifically, in the gas sensors 100A to 100C illustrated in FIGS. 1 to 3, the heating by the heater 81 is controlled to heat the oxygen pump cell Cp to the second heating temperature. In other words, the second heating temperature is a temperature to be controlled by the heater 81.

First, in the sensor element 101A illustrated in FIG. 1, two zones having different disposition relations with the heater 81 are defined. One of the zones is a first zone Z1 corresponding to a range in which the heater 81 is disposed in the element longitudinal direction. The first zone Z1 is heated to a temperature relatively higher than that of any other site through heat generation by the heater 81. The other zone is a second zone Z2 in which the heater 81 is not disposed. The second zone Z2 is adjacent to the first zone Z1 in the element longitudinal direction and heated through heat generation by the heater 81, but is separated from the heater 81 and thus heated to a temperature lower than that of the first zone Z1. However, the temperature continuously decreases from a place at which the heater 81 exists to the base end part E2, and thus the first zone Z1 and the second zone Z2 do not necessarily have a clear boundary therebetween.

The oxygen pump cell Cp is positioned in the first zone Z1. In the first zone Z1, at least a region in which the oxygen pump cell Cp exists is heated to the second heating temperature by the heater 81.

The first heating temperature as a temperature at which the sensing cell Cs suitably operates is lower than the second heating temperature. Thus, the sensing cell Cs is disposed at a position where the first heating temperature is achieved in the second zone Z2. More specifically, in the sensor element 101A, the sensing cell Cs is disposed so that the reference electrode 20 is positioned on the leading end part E1 side compared to the pressure diffusion hole 83 in the reference gas introduction space 30.

As the first zone Z1 is heated to a higher temperature by the heater 81, or as the first zone Z1 is larger, the sensing cell Cs needs to be further separated from the oxygen pump cell Cp. However, when separated from the oxygen pump cell Cp excessively, the sensing cell Cs does not reach the first heating temperature through heating by the heater 81. This indicates that a distance (hereinafter referred to as an intercell distance) L between the oxygen pump cell Cp and the sensing cell Cs in the element longitudinal direction has a value in accordance with the temperature difference T2−T1 between the first heating temperature and the second heating temperature. In the present embodiment, the intercell distance L is the distance between the central positions of the oxygen pump cell Cp and the sensing cell Cs in the element longitudinal direction.

In other words, due to that the cells are disposed so that the intercell distance L matches with the temperature difference T2−T1, the sensor element 101A has such configuration that it is enabled to heat the oxygen pump cell Cp to the second heating temperature while heating and the sensing cell Cs to the first heating temperature lower than the second heating temperature, using only single heater 81. Accordingly, the gas sensor 100A including the sensor element 101A can acquire simultaneously in parallel the sensor output EMF at the sensing cell Cs, and the oxygen pump current Ip as an output in accordance with the concentration of oxygen in the measurement gas, which is obtained at the oxygen pump cell Cp, and thus, even when variation occurs to the concentration of oxygen in the measurement gas at determination of the concentration of the detection gas component in the measurement gas based on the sensor output EMF, the concentration of the detection gas component in the measurement gas can be accurately determined by performing correction based on the value of the oxygen pump current Ip.

Similarly, in the sensor element 101B illustrated in FIG. 2, the first zone Z1 is defined to be a range in which the main heat generation part 81A is disposed in the element longitudinal direction, and the second zone Z2 is defined to be a range in which the heater 81 is not disposed on the base end part E2 side, but in the sensor element 101B, in addition, a third zone Z3 is defined to be a range in which the sub heat generation part 81B is disposed between these two zones. The third zone Z3 has a temperature range between the temperature range of the first zone Z1 and the temperature range of the second zone Z2. This indicates that, in the sensor element 101B, the temperature slowly decreases from the place at which the heater 81 exists to the base end part E2 as compared to the sensor element 101A. Thus, in the sensor element 101B, the intercell distance L needs to be increased as compared to the sensor element 101A to obtain the first and second heating temperatures equal to each other. In the sensor element 101B, the sensing cell Cs is disposed so that the reference electrode 20 is positioned on the base end part E2 side compared to the pressure diffusion hole 83 in the reference gas introduction space 30.

However, the sensor element 101B is the same as the sensor element 101A in that the cells are disposed so that the intercell distance L matches with the temperature difference T2-T1 between the second heating temperature and the first heating temperature, and thus it is enabled to heat the oxygen pump cell Cp to the second heating temperature while heating the sensing cell Cs to the first heating temperature lower than the second heating temperature, using only single heater 81. Accordingly, similarly to the gas sensor 100A, the gas sensor 100B including the sensor element 101B can acquire simultaneously in parallel the sensor output EMF at the sensing cell Cs, and the oxygen pump current Ip as an output in accordance with the concentration of oxygen in the measurement gas, which is obtained at the oxygen pump cell Cp. Thus, even when variation occurs to the concentration of oxygen in the measurement gas at determination of the concentration of the detection gas component in the measurement gas based on the sensor output EMF, the concentration of the detection gas component in the measurement gas can be accurately determined by performing correction based on the value of the oxygen pump current Ip.

Meanwhile, in the sensor element 101C illustrated in FIG. 3, the heater 81 includes the main heat generation part 81A and the sub heat generation part 81B, and the sensor element 101C is the same as the sensor element 101B illustrated in FIG. 2 in that three zones of the first zone Z1 to the third zone Z3 are defined, but the sensing cell Cs is disposed in the third zone Z3 in which the sub heat generation part 81B is provided and that is heated to a temperature higher than that of the second zone Z2. This is achieved by setting the second heating temperature to be lower than that of the sensor element 101B and reducing heat generation at the main heat generation part 81A and the sub heat generation part 81B as compared to the sensor element 101B. However, the pumping performance of the oxygen pump cell Cp, which needs to be sufficiently maintained, tends to decrease as the heating temperature decreases.

In the sensor element 101C, such opposing requests of the decrease of the heating temperature and the maintenance of the pumping performance at the oxygen pump cell Cp are satisfied by increasing the diffusion resistance at the gas introduction part 40 to reduce the amount of measurement gas flowing into the internal space 50. This is based on a fact that the absolute amount of oxygen to be pumped out by the oxygen pump cell Cp to measure the concentration of oxygen in the measurement gas decreases as the amount of measurement gas flowing into the internal space 50 decreases, and thus the oxygen pump cell Cp can reliably pump out oxygen in the measurement gas even when the pumping performance is measurably decreased by setting the second heating temperature to be low. As the diffusion resistance provided to the measurement gas by the gas introduction part 40 increases and the absolute amount of oxygen to be pumped out decreases, the value of the oxygen pump current Ip as the limiting current decreases, but no problem occurs to operation of the gas sensor 100, in particular, as long as the oxygen pump current Ip is sufficient for calculation of the concentration of oxygen. The decrease of the value of the oxygen pump current Ip as the diffusion resistance provided to the measurement gas by the gas introduction part 40 increases indicates that the diffusion resistance and the value of the oxygen pump current Ip have correlation therebetween.

For example, when the sensor element 101B illustrated in FIG. 2 and the sensor element 101C illustrated in FIG. 3 are compared, in the latter, the openings at the diffusion control parts 41 (41A and 41B) are narrower than in the former, and accordingly, the diffusion resistance provided to the measurement gas is larger. Thus, although the disposition manner of the heater 81 is the same between both sensor elements, in the latter, the sensing cell Cs can be disposed in the third zone Z3 close to the oxygen pump cell Cp by setting the second heating temperature to be lower than that of the former and setting the intercell distance L to be shorter than that of the former. Being able to lower the second heating temperature and shorten the intercell distance L means that the temperature difference T2-T1 between the second heating temperature and the first heating temperature can be reduced.

This indicates that the range of the second heating temperature as the heating temperature of the oxygen pump cell Cp when the concentration of the detection gas component is determined by the gas sensor 100 is determined in accordance with the diffusion resistance of the gas introduction part 40, within the above-described second temperature range of 580° C. or higher and 850° C. or lower.

FIGS. 8A to 8C and 9A to 9C are each a diagram for description of the influence of difference in the diffusion resistance of the gas introduction part 40 on the pumping performance of the oxygen pump cell Cp. The pumping performance can be evaluated based on the manner of change of the oxygen pump current Ip relative to the concentration of oxygen when the pump-out of oxygen by the oxygen pump cell Cp is performed for a plurality of evaluation gasses containing oxygen at different concentrations.

Figure 8A:
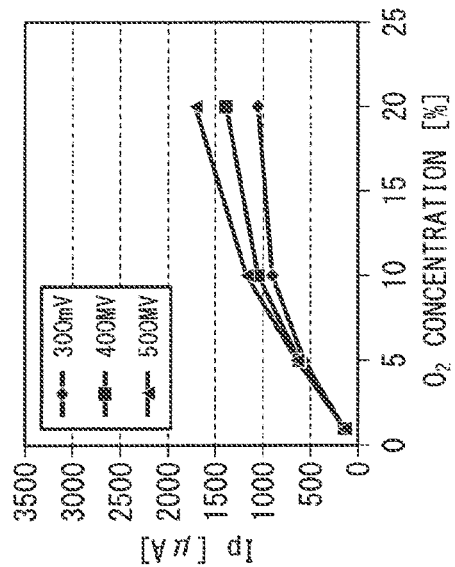
FIGS. 8A to 8C are diagrams for description of influence of difference in the diffusion resistance of the gas introduction part 40 on the pumping performance of an oxygen pump cell Cp.
Figure 8B:
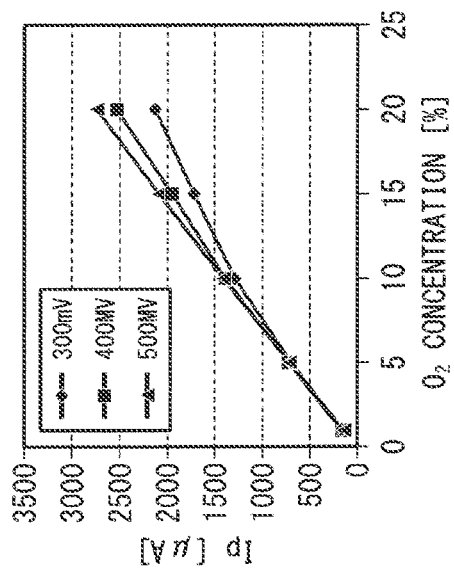
Figure 8C:
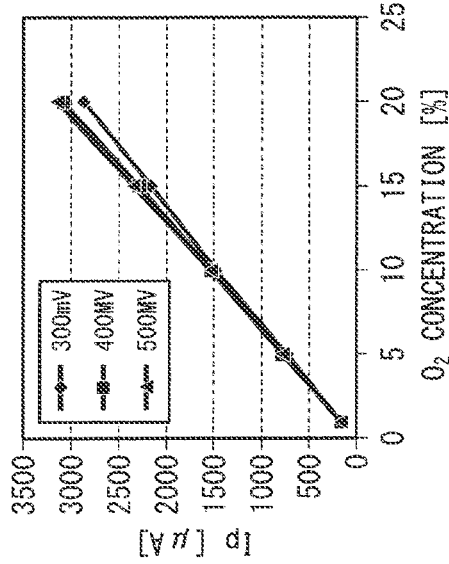
Figure 9A:
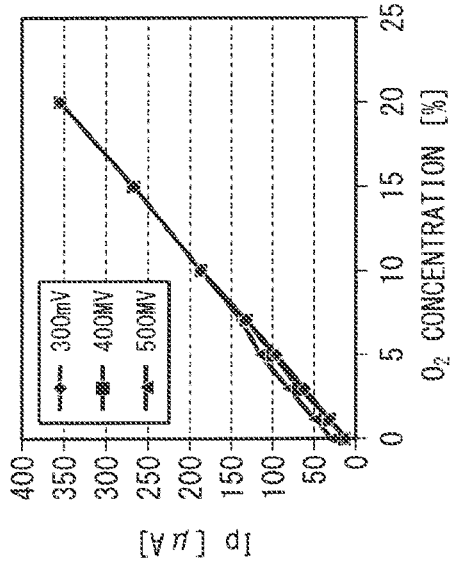
FIGS. 9A to 9C are diagrams for description of influence of difference in the diffusion resistance of the gas introduction part 40 on the pumping performance of the oxygen pump cell Cp.
Figure 9B:
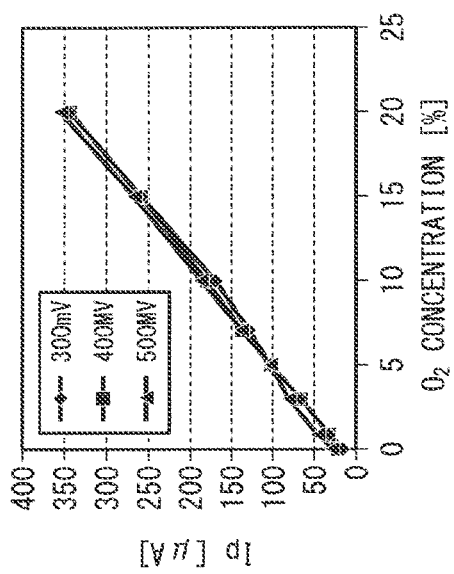
Figure 9C:
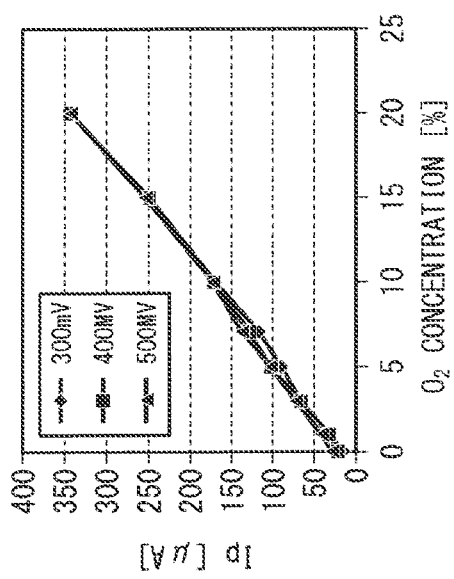

FIGS. 8A to 8C illustrate results for a sensor element in which the diffusion resistance of the gas introduction part 40 is 250 $cm^{-1}$. More specifically, FIGS. 8A, 8B, and 8C illustrate results when the second heating temperature is 790° C., 720° C., and 650° C., respectively. FIGS. 9A to 9C illustrate results for a sensor element in which the diffusion resistance of the gas introduction part 40 is 900 $cm^{-1}$. More specifically, FIGS. 9A, 9B, and 9C illustrate results when the second heating temperature is 720° C., 650° C., and 580° C., respectively. In any case, evaluation is performed for three different levels of 300 mV, 400 mV, and 500 mV of voltage provided between the inner side pump electrode 60 and the outer side pump electrode 70 by the pump power source 120.

In the configuration illustrated in FIGS. 8A to 8C in which the diffusion resistance of the gas introduction part 40 is relatively small, sufficient pumping performance is not obtained (oxygen concentration dependency of the oxygen pump current Ip is not sufficient) when the second heating temperature is lower than 700° C. However, in the configuration illustrated in FIGS. 9A to 9C in which the diffusion resistance of the gas introduction part 40 is relatively large, sufficient pumping performance is obtained even when the second heating temperature is 580° C. This indicates that the second heating temperature can be decreased by increasing the diffusion resistance of the gas introduction part 40, in other words, the second heating temperature is determined in accordance with the diffusion resistance of the gas introduction part 40.

For example, the second heating temperature needs to be 700° C. to 850° C. when the diffusion resistance provided to the measurement gas by the gas introduction part 40 is 250 $cm^{-1}$ to 500 $cm^{-1}$, but the second heating temperature suffices at 580° C. to 700° C. when the diffusion resistance provided to the measurement gas by the gas introduction part 40 is 500 $cm^{-1}$ to 900 $cm^{-1}$. The sensing cell Cs is enough to be disposed at the intercell distance L that matches with the temperature difference between the second heating temperature and the first heating temperature. But, when the diffusion resistance provided to the measurement gas by the gas introduction part 40 exceeds 2000 $cm^{-1}$, the absolute amount of measurement gas reaching the internal space 50 decreases excessively, and the oxygen pump current Ip is not sufficiently obtained, which is not preferable.

As described above, the sensor element 101C is different from the sensor element 101B in the magnitude of the diffusion resistance provided to the measurement gas by the gas introduction part 40, the disposition relation between the heater 81 and the sensing cell Cs, and the second heating temperature, but is the same as the sensor elements 101A and 101B in that the cells are disposed so that the intercell distance L matches with the temperature difference T2-T1 between the second heating temperature and the first heating temperature, and thus it is enabled to heat the oxygen pump cell Cp to the second heating temperature while heating the sensing cell Cs to the first heating temperature lower than the second heating temperature, using only single heater 81. Accordingly, similarly to the gas sensors 100A and 100B, the gas sensor 100C including the sensor element 101C can acquire simultaneously in parallel the sensor output EMF at the sensing cell Cs, and the oxygen pump current Ip as an output in accordance with the concentration of oxygen in the measurement gas, which is obtained at the oxygen pump cell Cp. Thus, even when variation occurs to the concentration of oxygen in the measurement gas at determination of the concentration of the detection gas component in the measurement gas based on the sensor output EMF, the concentration of the detection gas component in the measurement gas can be accurately determined by performing correction based on the value of the oxygen pump current Ip.

Additionally, in the sensor element 101C, the gas introduction part 40 is configured so that the diffusion resistance provided to the measurement gas increases in a range in which no difficulties occur to acquisition of the oxygen pump current Ip, which is necessary for calculation of the concentration of oxygen. Accordingly, in the gas sensor 100C including the sensor element 101C, despite that the second heating temperature is set to be low and the sensing cell Cs is disposed closer to the oxygen pump cell Cp compared to a case where the diffusion resistance of the gas introduction part 40 is small, the concentration of the detection gas component in the measurement gas can be accurately determined, with variation in the concentration of oxygen taken into consideration.

The decrease of the second heating temperature leads to reduction of a thermal load on the sensor element 101, and thus an aspect in which the diffusion resistance of the gas introduction part 40 is increased as in the sensor element 101C contributes to improvement of durability of the sensor element 101 and hence a longer lifetime.

As exemplarily illustrated in FIGS. 4A to 4E, the gas introduction part 40 may have various kinds of configurations, and the method of increasing the diffusion resistance provided to the measurement gas at the gas introduction part 40 is not necessarily limited to provision of the diffusion control parts 41. For example, the diffusion resistance can be increased by adjusting the shape and size of the gas introduction part 40. Thus, the gas introduction part 40 including the diffusion control parts 41 does not necessarily provide larger diffusion resistance to the measurement gas than the gas introduction part 40 including no diffusion control part 41.

In a sensor element having a configuration same as that of the sensor element 101C, the second heating temperature can be set to be equivalent to the heating temperature needed in the sensor element 101B, but in this case, the sensing cell Cs needs to be disposed in a manner same as in the sensor element 101B.

As described above, according to the present embodiment, in a sensor element provided to a gas sensor, a sensing cell as a mixed potential cell configured to detect a detection gas component in measurement gas and an oxygen pump cell configured to pump out oxygen in the measurement gas are disposed at a distance with which the cells are heated by using one heater to respective heating temperatures in which the cells suitably operate. The gas sensor including the sensor element can acquire simultaneously in parallel a sensor output at the sensing cell, and a pump current as an output in accordance with the concentration of oxygen in the measurement gas, which is obtained at the oxygen pump cell. Thus, even when variation occurs to the concentration of oxygen in the measurement gas at determination of the concentration of the detection gas component in the measurement gas based on the sensor output, the concentration of the detection gas component in the measurement gas can be accurately determined by performing correction based on the value of the pump current. Accordingly, the gas sensor according to the present embodiment can excellently remove influence of oxygen in the measurement gas to accurately determine the concentration of the detection gas component.

Means for obtaining an output related to the detection gas component and means for obtaining information related to the concentration of oxygen in the measurement gas might be provided separately from each other, and the output of the former might be corrected based on the information obtained from the latter, thereby determining the concentration of the detection gas component. However, in this case, the measurement accuracy is potentially adversely affected by, for example, difference in measurement gas atmosphere due to the difference between the installation positions of both means, and generation of a correction time lag.

The gas sensor according to the present embodiment is excellent in the measurement accuracy as compared to a configuration in which each output is acquired by separately provided means because the single gas sensor can obtain the two outputs of the sensor output and the pump current simultaneously in parallel from one measurement gas atmosphere.

In addition, a temperature at which the oxygen pump cell operates can be decreased by increasing the diffusion resistance provided to the measurement gas, which is applied by a gas introduction port as an introduction path through which the measurement gas is introduced into the internal space provided to the sensor element in order to pump out oxygen from the measurement gas. In this case, the second heating temperature can be decreased, thereby to reduce a thermal load on the sensor element, which leads to improvement of durability of the sensor element and hence a longer lifetime of the sensor element.

EXAMPLES

Nine kinds of the gas sensors 100 (samples 1-1 to 1-3, 2-1 to 2-3, and 3-1 to 3-3) in which the magnitude of the diffusion resistance provided to the measurement gas by the gas introduction part 40 and the intercell distance L were varied in three different levels were prepared, and the quality of operation of the oxygen pump cell Cp and the sensing cell Cs was evaluated for each sample. Then, each evaluation results were summed up, so as to clarify the existence of conditions under which the gas sensors 100 suitably operate.

Specifically, the evaluation was performed on the gas sensors 100 each having a configuration in which the gas introduction part 40 of the sensor element 101 includes the two diffusion control parts 41 (41A and 41B) as illustrated in FIGS. 2 and 3. The dimensions of the sensor element 101 were 2.3 mm, 1.15 mm, and 0.64 mm, in the element longitudinal direction, the thickness direction (including the surface protective layer), and the width direction, respectively. The dimension of the oxygen pump cell Cp in the element longitudinal direction was 2.3 mm, the dimension of the sensing cell Cs in the element longitudinal direction was 3.1 mm, and the dimension of the heater 81 in the element longitudinal direction was 9.3 mm.

The magnitude of the diffusion resistance provided to the measurement gas by the gas introduction part 40 through the diffusion control parts 41 was differentiated at three levels of 250, 500, and 900 cm$^{-1}$.

The intercell distance L was differentiated at three levels of 2 mm, 4 mm, and 7 mm. It was checked in advance that when the intercell distance L was set to these values, the temperature difference T2-T1 between the second heating temperature T2 and the first heating temperature T1 was 100° C., 200° C., and 300° C., respectively.

Table 1 lists results of evaluation on the quality of the operation of the oxygen pump cell Cp. The evaluation was performed for the second heating temperature T2 at five different levels of 500° C., 600° C., 700° C., 800° C., and 850° C. by using a plurality of model gasses each containing $C_2H_4$ at 1000 ppm as the detection gas component, oxygen at any of 1%, 5%, 10%, 20%, water vapor at 5%, and nitrogen as the balance. In the evaluation, for each sample, the flow speed of the measurement gas at a place where the sensor element is disposed was 20 m/sec, and the temperature of the measurement gas was 250° C.

Table 1 lists results of the evaluation together with the intercell distance L, the condition of the temperature difference T2-T1 corresponding to the intercell distance L, and the limiting current value (hereinafter referred to as a reference limiting current value) of each sample when the concentration of oxygen is 20%.

The reference of the evaluation was as follows. It was evaluated that the oxygen pump cell Cp excellently operates when the limiting current value is obtained for all measurement gasses containing oxygen at different concentrations. In Table 1, a circle is provided in the cell of evaluation result for a condition (combination of each sample and each second heating temperature T2) under which such evaluation was obtained. It was evaluated that the oxygen pump cell Cp does not excellently operate when the value of the oxygen pump current Ip does not reach the limiting current value for any measurement gas. In Table 1, a cross is provided in the cell of evaluation result for a condition under which such evaluation was obtained. When evaluation between the above evaluations was made such that the oxygen pump cell Cp operates at low accuracy, a triangle is provided in the cell of evaluation result in Table 1 for a condition under which such evaluation was obtained.

As understood from results listed in Table 1, as the value of the limiting current value decreases (as the diffusion resistance at the gas introduction part 40 increases), the oxygen pump cell Cp excellently operates even when the second heating temperature T2 is low.

The reason why the reference limiting current value and the result of determination on the operation of the oxygen pump cell Cp are the same between samples 1-1 to 1-3, between samples 2-1 to 2-3, and between samples 3-1 to 3-3 is that the evaluation does not depend on the disposition of the sensing cell Cs. The reference limiting current value has correlation with the value of the diffusion resistance provided to the measurement gas by the gas introduction part 40, and thus can be used as a parameter indicating the degree of the diffusion resistance.

Table 2 lists results of evaluation on the quality of the operation of the sensing cell Cs. The evaluation was performed for the second heating temperature T2 at five levels of 500° C., 600° C., 700° C., 800° C., and 850° C. by using a plurality of model gasses each containing $C_2H_4$ as the detection gas component at any of 100 ppm, 300 ppm, 500 ppm, 700 ppm, 1000 ppm, 2000 ppm, 4000 ppm, oxygen at 10%, water vapor at 5%, and nitrogen as the balance. In the evaluation, for each sample, the flow speed of the measurement gas at a place where the sensor element is disposed was 20 m/sec, and the temperature of the measurement gas was 250° C.

TABLE 1

| | Sample | | | | | | | | |
|---|---|---|---|---|---|---|---|---|---|
| | 1-1 | 1-2 | 1-3 | 2-1 | 2-2 | 2-3 | 3-1 | 3-2 | 3-3 |
| Intercell distance L (mm) | 2 | 4 | 7 | 2 | 4 | 7 | 2 | 4 | 7 |
| T2 − T1 (° C.) | 100 | 200 | 300 | 100 | 200 | 300 | 100 | 200 | 300 |
| Limiting current value (mA) | | 3 | | | 1.5 | | | 0.35 | |
| T2 (° C.) 500 | x | x | x | x | x | x | Δ | Δ | Δ |
| 600 | x | x | x | Δ | Δ | Δ | ○ | ○ | ○ |
| 700 | Δ | Δ | Δ | ○ | ○ | ○ | ○ | ○ | ○ |
| 800 | ○ | ○ | ○ | ○ | ○ | ○ | ○ | ○ | ○ |
| 850 | ○ | ○ | ○ | ○ | ○ | ○ | ○ | ○ | ○ |

TABLE 2

| | Sample | | | | | | | | |
|---|---|---|---|---|---|---|---|---|---|
| | 1-1 | 1-2 | 1-3 | 2-1 | 2-2 | 2-3 | 3-1 | 3-2 | 3-3 |
| Intercell distance L (mm) | 2 | 4 | 7 | 2 | 4 | 7 | 2 | 4 | 7 |
| T2 − T1 (° C.) | 100 | 200 | 300 | 100 | 200 | 300 | 100 | 200 | 300 |
| Limiting current value (mA) | | 3 | | | 1.5 | | | 0.35 | |
| T2 (° C.) 500 | Δ | x | x | Δ | x | x | Δ | x | x |
| 600 | ○ | Δ | x | ○ | Δ | x | ○ | Δ | x |
| 700 | Δ | ○ | Δ | Δ | ○ | Δ | Δ | ○ | Δ |
| 800 | x | Δ | ○ | x | Δ | ○ | x | Δ | ○ |
| 850 | x | x | ○ | x | x | ○ | x | x | ○ |

Table 2 lists results of the evaluation together with the intercell distance L, the condition of the temperature difference T2-T1 corresponding to the intercell distance L, and the reference limiting current value of each sample. The value of the first heating temperature T1 when the second heating temperature T2 is any of the above-described values is specified from the value of the temperature difference T2-T1.

The reference of the evaluation was as follows. It was evaluated that the sensing cell Cs excellently operates when the sensor output monotonically increases with the concentration of $C_2H_4$ over the entire concentration range of $C_2H_4$. In Table 2, a circle is provided in the cell of evaluation result for a condition (combination of each sample and each second heating temperature T2) under which such evaluation was obtained. It was evaluated that the sensing cell Cs does not excellently operate when the sensor output does not change with the concentration of $C_2H_4$ at least in part of the concentration range of $C_2H_4$. In Table 2, a cross is provided in the cell of evaluation result for a condition under which such evaluation was obtained. When evaluation between the above evaluations was made such that the sensing cell Cs operates but the change of the sensor output with the concentration of $C_2H_4$ is not sufficient, a triangle is provided in the cell of evaluation result in Table 2 for a condition under which such evaluation was obtained.

As understood from results listed in Table 2, to excellently operate the sensing cell Cs, the intercell distance L needs to be increased in order to maintain a larger temperature difference T2-T1 between the second heating temperature T2 and the first heating temperature T1, as the second heating temperature T2 as a temperature at which the oxygen pump cell Cp suitably operates increases. In other words, the results listed in Table 2 indicates that the sensing cell Cs excellently operates irrespective of the second heating temperature T2 as long as the sensing cell Cs is disposed so that the first heating temperature is 500° C. to 550° C. approximately.

Table 3 sums up the evaluation results listed in Table 1 and the evaluation results listed in Table 2.

TABLE 3

| | Sample | | | | | | | | |
|---|---|---|---|---|---|---|---|---|---|
| | 1-1 | 1-2 | 1-3 | 2-1 | 2-2 | 2-3 | 3-1 | 3-2 | 3-3 |
| Intercell distance L (mm) | 2 | 4 | 7 | 2 | 4 | 7 | 2 | 4 | 7 |
| T2 − T1 (° C.) | 100 | 200 | 300 | 100 | 200 | 300 | 100 | 200 | 300 |
| Limiting current value (mA) | | 3 | | | 1.5 | | | 0.35 | |
| T2 (° C.) 500 | x | x | x | x | x | x | Δ | x | x |
| 600 | x | x | x | Δ | Δ | x | ○ | Δ | x |
| 700 | Δ | Δ | Δ | Δ | ○ | Δ | Δ | ○ | Δ |
| 800 | x | Δ | ○ | x | Δ | ○ | x | Δ | ○ |
| 850 | x | x | ○ | x | x | ○ | x | x | ○ |

Table 3 lists the evaluation results together with the intercell distance L, the condition of the temperature difference T2-T1 corresponding to the intercell distance L, and the reference limiting current value of each sample.

Each cell of evaluation result in Table 3 has a mark of inferior evaluation among two marks (a circle, a cross, or a triangle) provided in the cells of the same condition in Tables 1 and 2. Thus, in each cell of evaluation result in Table 3, a circle is provided only when circles are provided in both corresponding cells of evaluation result in Tables 1 and 2. When a cross is provided in at least one of the cells, a cross is provided in the cell of evaluation result in Table 3. When triangles are provided in both Tables 1 and 2 or when a triangle and a circle are provided in Tables 1 and 2, a triangle is provided in the cell of evaluation result in Table 3. This indicates that the gas sensor 100 excellently operates under a condition for which a circle is provided in Table 3, in other words, the concentration of the detection gas component can be accurately determined by correcting influence of oxygen.

As understood from Table 3, under some conditions, circles are provided in cells of evaluation result. This indicates that it is possible to achieve, under a predetermined condition, a gas sensor including the sensing cell Cs and the oxygen pump cell Cp having preferable operation temperatures different from each other and one sensor element and configured to correct, based on the pump current value output from the oxygen pump cell Cp, the concentration of the detection gas component determined based on the sensor output from the sensing cell Cs.

More specifically, among the three samples 1-1 to 1-3 in which the reference limiting current value is relatively large at 3 mA, in other words, samples in which the diffusion resistance provided to the measurement gas by the gas introduction part 40 is relatively small, excellent operation was evaluated (a circle is provided in an evaluation result cell) only when the second heating temperature T2 was 800° C. and 850° C. in Sample 1-3 in which the intercell distance L was 7 mm and the temperature difference T2-T1 was 300° C.

Among the samples in which the reference limiting current value was 1.5 mA, a result same as that of sample 1-3 was obtained for sample 2-3 in which the intercell distance L was 7 mm, and excellent operation was evaluated when the second heating temperature T2 was 700° C. in sample 2-2 in which the intercell distance L was 4 mm and the temperature difference T2-T1 was 200° C.

In addition, among samples in which the reference limiting current value was 0.35 mA, a result same as those of sample 1-3, 2-3 was obtained for sample 3-3, a result same as that of sample 2-2 was obtained for sample 3-2, and excellent operation was evaluated when the second heating temperature T2 was 600° C. in sample 3-1 in which the intercell distance L was 2 mm and the temperature difference T2-T1 was 100° C.

Thus, as the reference limiting current value decreases, in other words, as the diffusion resistance provided to the measurement gas by the gas introduction part 40 becomes relatively large, a condition range in which the gas sensor 100 is determined to excellently operate expands toward a side on which the temperature difference T2-T1 is smaller on the low temperature side of the second heating temperature T2.

It is confirmed from this result that, when the first heating temperature T1 is substantially constant in the first temperature range, the range of the second heating temperature in the second temperature range is determined in accordance with the diffusion resistance provided to the measurement gas by the gas introduction part 40, and it is enabled to decrease the second heating temperature T2 by increasing the diffusion resistance.

Figure 10:
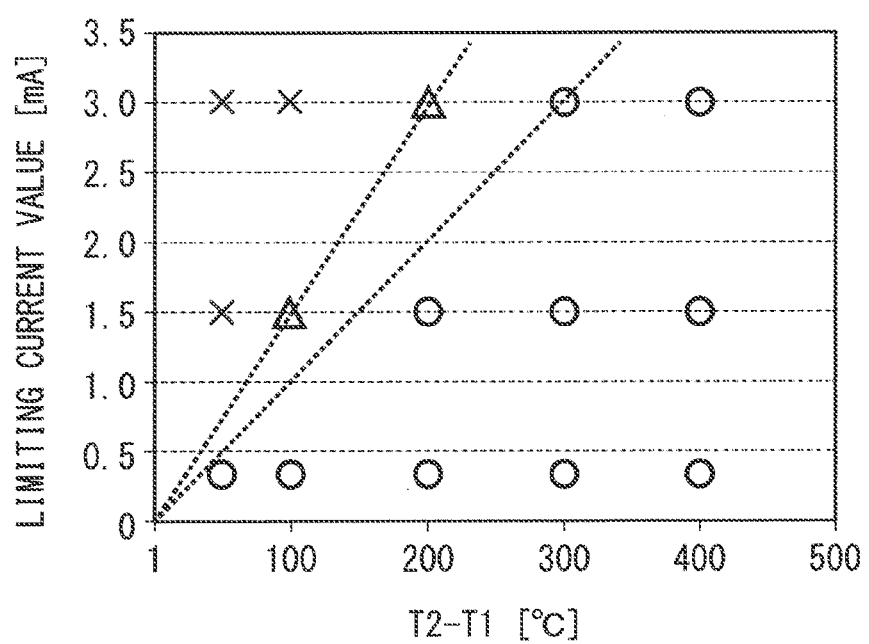
FIG. 10 is a characteristic diagram of a gas sensor 100.

FIG. 10 is a characteristic diagram of the gas sensor 100, which is produced by adding data for T2-T1=50° C. and 400° C. to the results listed in Table 3. In FIG. 10, the horizontal axis represents the temperature difference T2-T1 and the vertical axis represents the reference limiting current value, and a circle is provided to a combination of the value of the temperature difference T2-T1 and the value of the reference limiting current value with which the gas sensor 100 was determined to excellently operate, a cross is provided to a combination with which the gas sensor 100 was determined not to excellently operate, and a triangle is provided to a combination determined to be between the determinations.

FIG. 10 indicates that the gas sensor 100 can operate in the range of y≤0.015×(range below straight line C1) where x represents a value on the horizontal axis and y represents a value on the vertical axis, and the gas sensor 100 excellently operates in the range of y≤0.0106×(range below straight line C2).

<Modifications>

Figure 11:
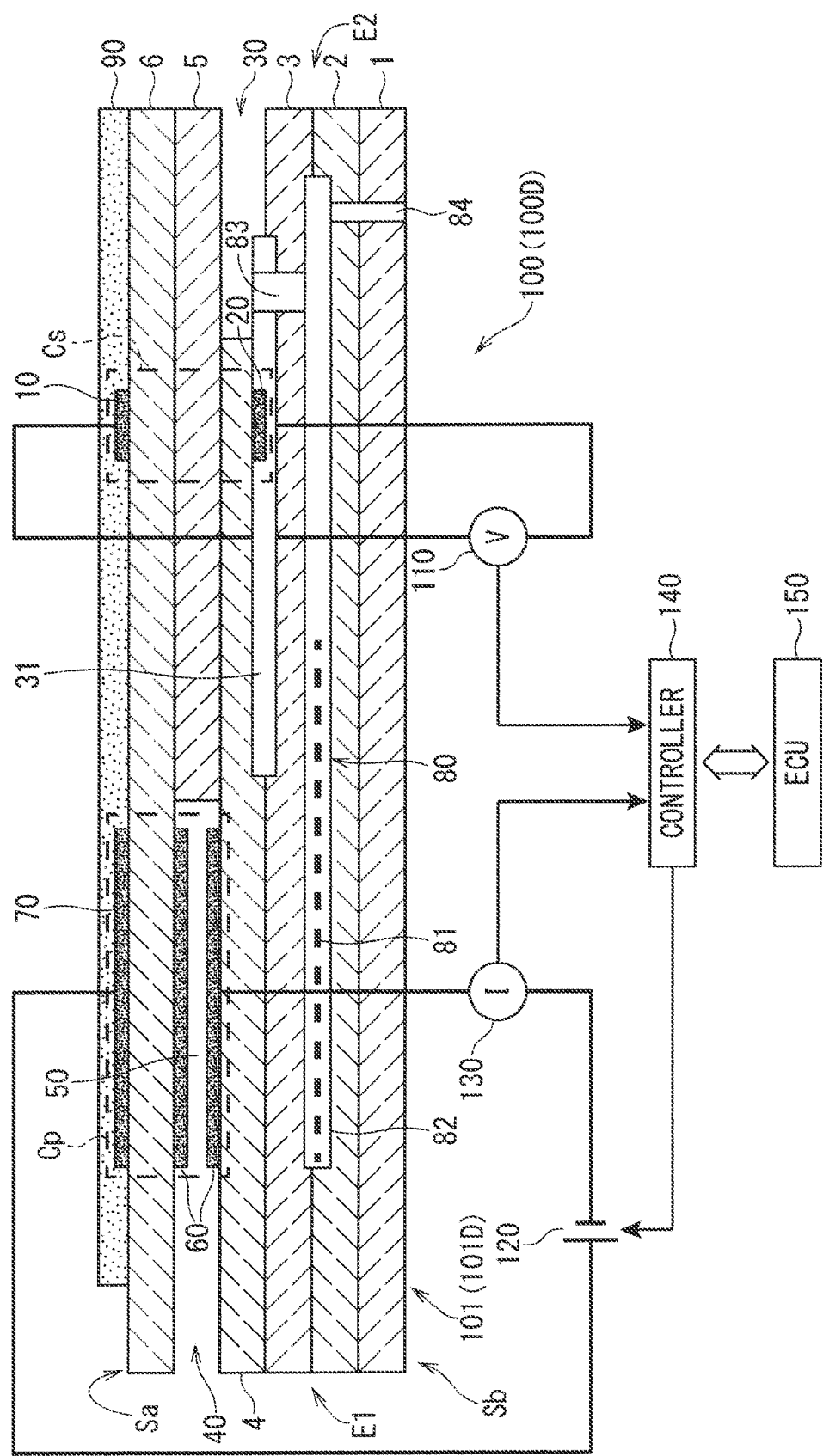
FIG. 11 is a diagram illustrating a gas sensor 100D according to a modification.
Figure 12:
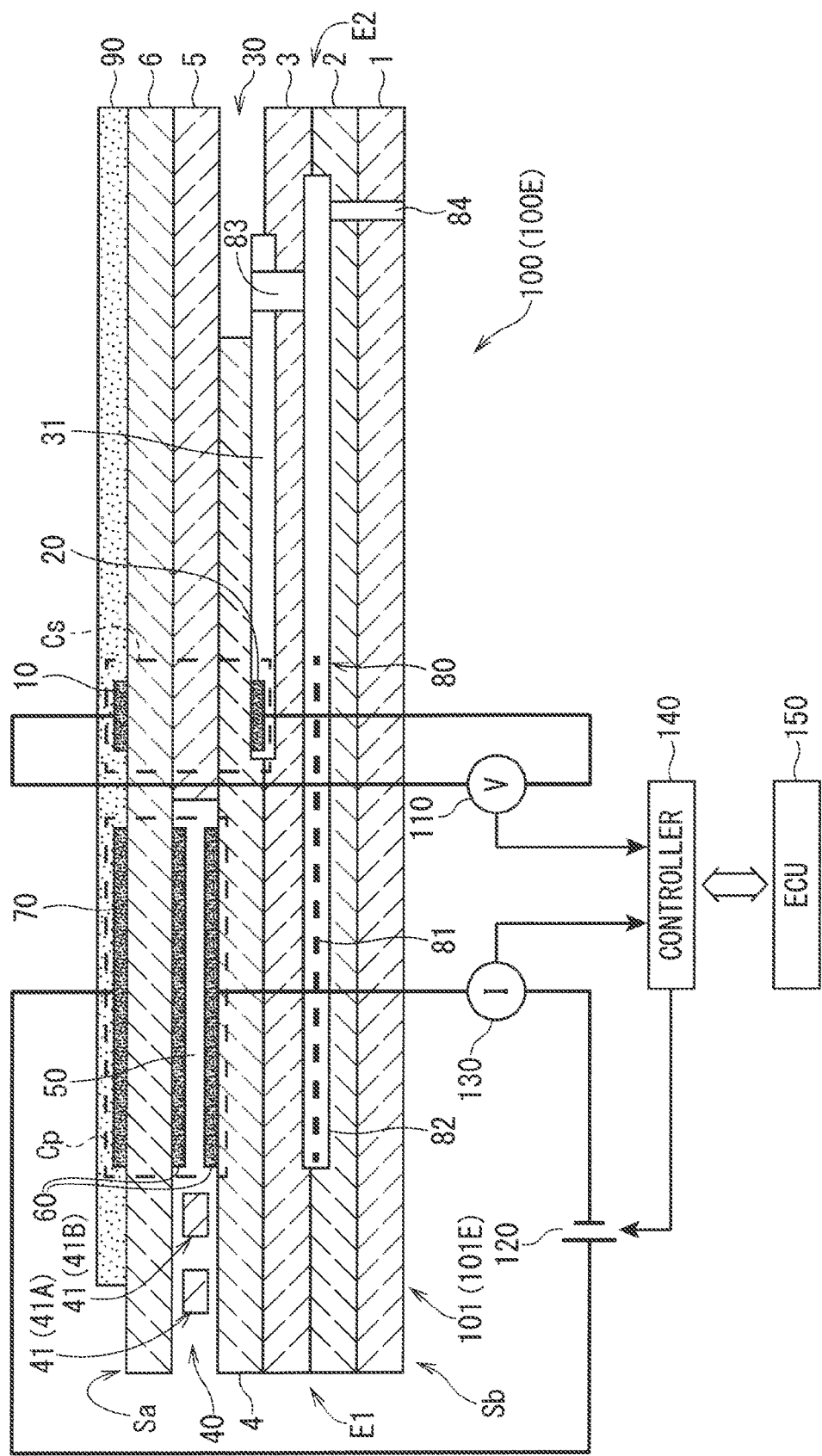
FIG. 12 is a diagram illustrating a gas sensor 100E according to a modification.
Figure 13:
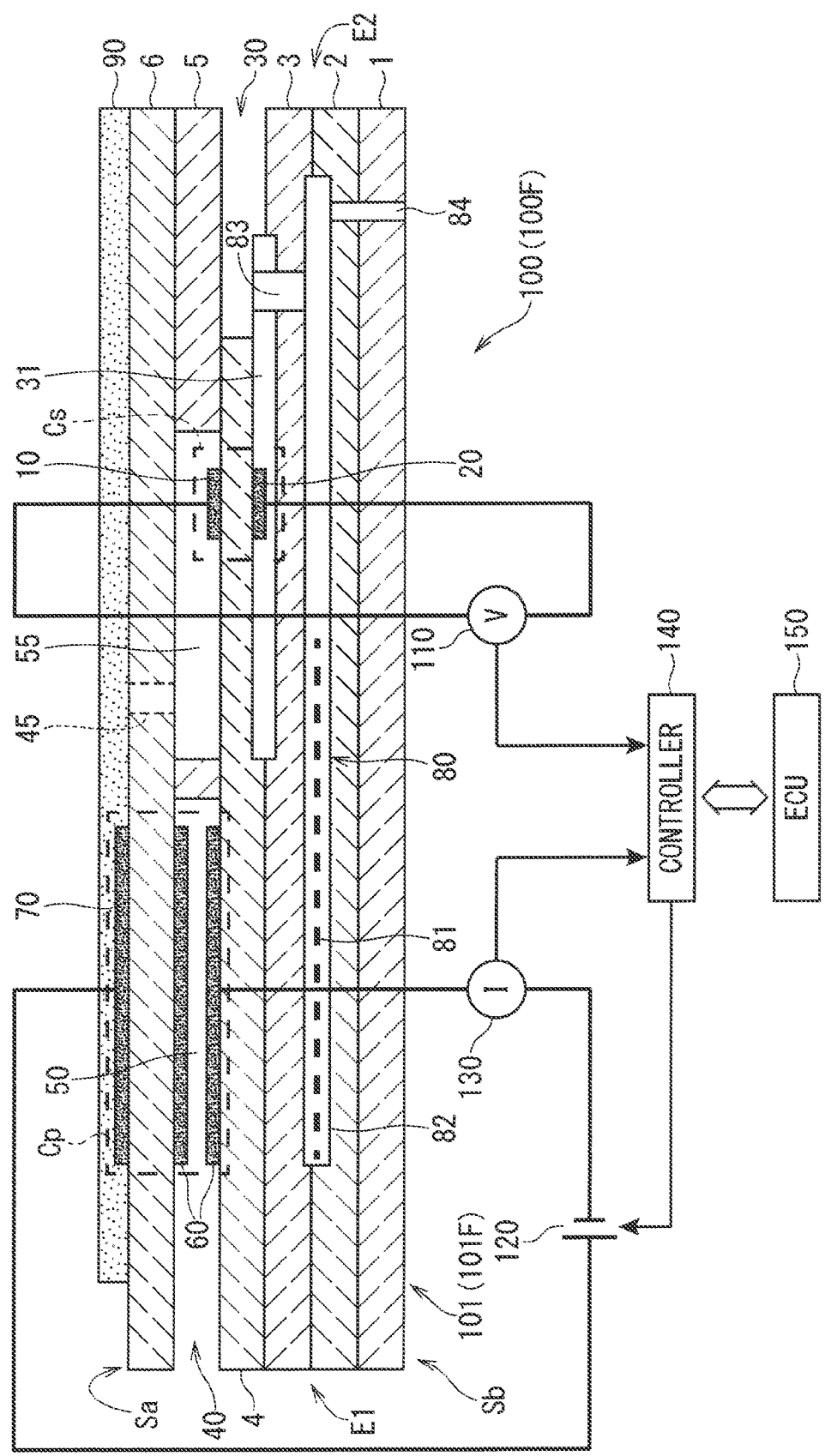
FIG. 13 is a diagram illustrating a gas sensor 100F according to a modification.

In the gas sensors 100A to 100C illustrated in FIGS. 1 to 3, the sensing electrode 10 is provided on the front surface Sa of the sensor element 101, and the reference electrode 20 is provided in the reference gas introduction space 30 provided to the sensor element 101, but the disposition manners of the sensing electrode 10 and the reference electrode 20 are not limited thereto. FIGS. 11 to 13 are diagrams exemplarily illustrating the gas sensors 100 (100D to 100F) according to modifications in which the disposition of the sensing electrode 10 or the reference electrode 20 is different from that in the gas sensors 100A to 100C.

In each of the gas sensors 100 (100D and 100E) illustrated in FIGS. 11 and 12, a reference gas introduction layer 31 communicated with the reference gas introduction space 30 is provided between the third solid electrolyte layer 3 and the fourth solid electrolyte layer 4 of the sensor element 101 (101D or 101E), and the reference electrode 20 is provided in the reference gas introduction layer 31, but not in the reference gas introduction space 30. The reference gas introduction layer 31 is made of, for example, porous alumina.

Specifically, the sensor element 101D illustrated in FIG. 11 includes the reference gas introduction layer 31 in addition to the configuration of the sensor element 101A illustrated in FIG. 1.

The sensor element 101E illustrated in FIG. 12 includes the reference gas introduction layer 31 in addition to the configuration of the sensor element 101C illustrated in FIG. 3. In the sensor element 101E illustrated in FIG. 12, the existence range of the heater 81 is shorter than that in the sensor element 101C illustrated in FIG. 3, but the sensor element 101E is the same as the sensor element 101C in that the sensing cell Cs is disposed above the heater 81 in the drawing. This indicates that, also in the sensor element 101E illustrated in FIG. 12, the diffusion resistance on the measurement gas at the gas introduction part 40 is increased, thereby to lower the second heating temperature so that the sensing cell Cs at the position can operate under the first heating temperature.

In the gas sensor 100 (100F) illustrated in FIG. 13, similarly to the sensor elements 101 (101D and 101E) of the gas sensors 100 (100D and 100E) illustrated in FIGS. 11 and 12, the sensor element 101 (101F) includes the reference gas introduction layer 31, and the reference electrode 20 is provided in the reference gas introduction layer 31. In addition, a second internal space 55 as a space separated from the internal space 50 is provided between the fourth solid electrolyte layer 4 and the sixth solid electrolyte layer 6. The second internal space 55 is communicated with an external space through a gas introduction hole 45 penetrating through the sixth solid electrolyte layer 6. In the gas sensor 100F, the sensing electrode 10 is disposed in the second internal space 55, but not on the front surface Sa.

In the gas sensor 100F having such a configuration, the concentration of the detection gas component is determined for measurement gas introduced into the second internal space 55 through the gas introduction hole 45.

In the sensor elements 101D to 101F, similarly to the sensor elements 101A to 101C, both cells are disposed so that the intercell distance L matches with the temperature difference between the second heating temperature and the first heating temperature, and thus, it is enabled to heat the oxygen pump cell Cp to the second heating temperature while heating the sensing cell Cs to the first heating temperature lower than the second heating temperature, using only single heater 81. Accordingly, similarly to the gas sensors 100A to 100C illustrated in FIGS. 1 to 3, the gas sensors 100D to 100F illustrated in FIGS. 11 to 13 can accurately calculate the concentration of the detection gas component in the measurement gas by correcting the sensor output EMF at the sensing cell Cs based on the oxygen pump current Ip at the oxygen pump cell Cp, when variation occurs to the concentration of oxygen in the measurement gas.

In the above embodiments, description is made on a configuration in which the disposition range of the heater 81 in the element longitudinal direction includes at least the existence range of the oxygen pump cell Cp in the element longitudinal direction. However, even if the disposition relation between the heater 81 and the oxygen pump cell Cp is different from that in this configuration, the gas sensor 100 may still excellently operate as long as the sensor element 101 is configured to heat the sensing cell Cs to the first heating temperature and the oxygen pump cell Cp to the second heating temperature.

In the above-described embodiments, in the sensor element 101 in an elongated plate shape or bar shape, the heater 81 extends in the element longitudinal direction, the heater 81 and the oxygen pump cell Cp are stacked in the element thickness direction, and the oxygen pump cell Cp and the sensing cell Cs are separated from each other in the element longitudinal direction, but the disposition relation among the heater 81, the oxygen pump cell Cp, and the sensing cell Cs is not limited thereto. The sensing cell Cs may be stacked in the element thickness direction as long as the sensing cell Cs and the oxygen pump cell Cp are heated to the first heating temperature and the second heating temperature, respectively, through heating by the heater 81.

The invention claimed is:

1. A gas sensor of a mixed-potential type including a sensor element formed of a solid electrolyte having oxygen-ion conductivity and configured to measure a concentration of a predetermined gas component in measurement gas, wherein said sensor element includes:

an internal space that is communicated with an external space through a gas introduction part provided on one leading end part side and to which said measurement gas is introduced from said external space;

a sensing electrode provided at a part of said sensor element where said sensing electrode is contactable with the measurement gas;

a reference gas introduction space to which reference gas is introduced;

a reference electrode provided in said reference gas introduction space;

a sensing cell including said sensing electrode and said reference electrode;

an oxygen pump cell including an inner side pump electrode formed facing to said internal space, an outer side pump electrode formed on an outer surface of said sensor element, and said solid electrolyte between said inner side pump electrode and said outer side pump electrode, and configured to pump out oxygen in said internal space when a predetermined oxygen pump voltage is applied between said inner side pump electrode and said outer side pump electrode; and a heater capable of heating at least said sensing cell and said oxygen pump cell, said gas sensor further includes:

an oxygen pump power source configured to apply said predetermined oxygen pump voltage between said inner side pump electrode and said outer side pump electrode; and an electronic control unit (ECU) configured to specify the concentration of said predetermined gas component in said measurement gas, wherein, while said measurement gas is in contact with said sensing electrode and introduced in said internal space, said heater heats said sensing cell to a first heating temperature of 400° C. or higher and 600° C. or lower and heats said oxygen pump cell to a second heating temperature of 580° C. or higher and 850° C.

or lower in a temperature range determined in accordance with a diffusion resistance provided to said measurement gas by said gas introduction part, and said oxygen pump cell pumps out oxygen in said measurement gas in said internal space, said ECU specifies the concentration of a measurement target gas component in said measurement gas based on:

a sensor output value as a potential difference occurring between said sensing electrode and said reference electrode in accordance with the concentration of said predetermined gas component in said measurement gas; and the concentration of oxygen in said measurement gas specified based on a magnitude of a pump current flowing between said inner side pump electrode and said outer side pump electrode when oxygen in said measurement gas in said internal space is pumped out by said oxygen pump cell.

2. The gas sensor according to claim 1, wherein said oxygen pump cell and said heater are stacked in a thickness direction of said sensor element, said heater extends in a longitudinal direction of said sensor element, and said sensing cell is disposed at a position where said heater exists in said longitudinal direction.

3. The gas sensor according to claim 2, wherein said gas introduction part includes a diffusion control part.

4. The gas sensor according to claim 3, wherein the diffusion resistance provided to said measurement gas by said gas introduction part is 500 cm$^{-1}$ or more and 900 cm$^{-1}$ or less.

5. The gas sensor according to claim 2, wherein the diffusion resistance provided to said measurement gas by said gas introduction part is 500 cm$^{-1}$ or more and 900 cm$^{-1}$ or less.

6. The gas sensor according to claim 2, wherein said first heating temperature is 500° C. or higher and 550° C. or lower.

7. The gas sensor according to claim 2, wherein said sensing electrode is provided on a front surface of said sensor element.

8. The gas sensor according to claim 2, wherein said sensor element further includes:

a second internal space that is communicated with an external space through a gas introduction hole provided to a front surface of the sensor element and to which said measurement gas is introduced from said external space; and said sensing electrode is provided in said second internal space.

9. The gas sensor according to claim 1, wherein said oxygen pump cell and said heater are stacked in a thickness direction of said sensor element, said heater extends in a longitudinal direction of said sensor element, and said sensing cell is disposed at a position where said heater does not exist in said longitudinal direction.

10. The gas sensor according to claim 9, wherein the diffusion resistance provided to said measurement gas by said gas introduction part is 500 cm$^{-1}$ or more and 900 cm$^{-1}$ or less.

11. The gas sensor according to claim 9, wherein said first heating temperature is 500° C. or higher and 550° C. or lower.

12. The gas sensor according to claim 9, wherein said sensing electrode is provided on a front surface of said sensor element.

13. The gas sensor according to claim 9, wherein said sensor element further includes:
   a second internal space that is communicated with an external space through a gas introduction hole provided to a front surface of the sensor element and to which said measurement gas is introduced from said external space; and
   said sensing electrode is provided in said second internal space.

14. The gas sensor according to claim 1, wherein said gas introduction part includes a diffusion control part.

15. The gas sensor according to claim 14, wherein the diffusion resistance provided to said measurement gas by said gas introduction part is 500 cm$^{-1}$ or more and 900 cm$^{-1}$ or less.

16. The gas sensor according to claim 1, wherein the diffusion resistance provided to said measurement gas by said gas introduction part is 500 cm$^{-1}$ or more and 900 cm$^{-1}$ or less.

17. The gas sensor according to claim 16, wherein said second heating temperature is 580° C. or higher and 700° C. or lower.

18. The gas sensor according to claim 1, wherein said first heating temperature is 500° C. or higher and 550° C. or lower.

19. The gas sensor according to claim 1, wherein said sensing electrode is provided on a front surface of said sensor element.

20. The gas sensor according to claim 1, wherein said sensor element further includes:
   a second internal space that is communicated with an external space through a gas introduction hole provided to a front surface of the sensor element and to which said measurement gas is introduced from said external space; and
   said sensing electrode is provided in said second internal space.

* * * * *